(12) United States Patent
Jagatheesan et al.

(10) Patent No.: US 9,465,622 B2
(45) Date of Patent: Oct. 11, 2016

(54) APPLICATION DEFINED COMPUTING COMPONENT CONFIGURATION

(71) Applicant: Samsung Electronics Company, Ltd., Suwon, Gyeonggi-Do (KR)

(72) Inventors: Arun S. Jagatheesan, Cupertino, CA (US); Zheng Li, Santa Clara, CA (US); Mahdi Nazm Bojnordi, Rochester, NY (US); Jupyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 14/055,517

(22) Filed: Oct. 16, 2013

(65) Prior Publication Data

US 2014/0108773 A1 Apr. 17, 2014

Related U.S. Application Data

(60) Provisional application No. 61/715,037, filed on Oct. 17, 2012.

(51) Int. Cl.
*G06F 9/44* (2006.01)
*G06F 12/06* (2006.01)

(52) U.S. Cl.
CPC ......... *G06F 9/4401* (2013.01); *G06F 12/0653* (2013.01)

(58) Field of Classification Search
CPC .... G06F 9/4401; G06F 9/44505; G06F 9/50; G06F 9/5027; G06F 9/5044; G06F 11/3409; G06F 11/3442; G06F 12/0653; G06F 13/1694
See application file for complete search history.

(56) References Cited

U.S. PATENT DOCUMENTS

| 7,765,521 B2* | 7/2010 | Bryant | G06F 9/505 709/203 |
| 8,407,446 B2 | 3/2013 | Forrer et al. | |
| 2002/0062334 A1* | 5/2002 | Chen | G06F 9/465 709/200 |
| 2009/0179908 A1* | 7/2009 | Dirstine | G09G 5/00 345/547 |
| 2012/0089726 A1* | 4/2012 | Doddavula | H04L 67/34 709/224 |
| 2012/0137118 A1* | 5/2012 | Francois | G06F 9/44505 713/100 |
| 2013/0061214 A1* | 3/2013 | Jagatheesan | G06F 17/5054 717/151 |
| 2013/0268741 A1* | 10/2013 | Daly | G06F 12/023 711/165 |
| 2013/0282972 A1 | 10/2013 | Bojnordi et al. | |
| 2014/0136915 A1* | 5/2014 | Hyde | G06F 11/0703 714/747 |

OTHER PUBLICATIONS

Shye, A. et al., "Into the Wild: Studying Real User Activity Patterns to Guide Power Optimizations for Mobile Architectures", Proceedings of the 42nd Annual IEEE/ACM International Symposium on Microarchitecture (MICRO-42), Dec. 12-16, 2009, pp. 168-178, IEEE, United States.

(Continued)

*Primary Examiner* — Dennis M Butler
(74) *Attorney, Agent, or Firm* — Sherman IP LLP; Kenneth L. Sherman; Steven Laut

(57) ABSTRACT

One embodiment includes a configurable computing system. The configurable computing system includes a broker module that receives information for one or more applications, obtains one or more attributes for an electronic device, and determines runtime configurations for one or more components for the electronic device. A controller communicates with applications for configuring the one or more components based on the runtime configurations.

30 Claims, 12 Drawing Sheets

(56) References Cited

OTHER PUBLICATIONS

Isci, C. et al., "An Analysis of Efficient Multi-Core Global Power Management Policies; Maximizing Performance for a Given Power Budget", Proceedings of the 39th Annual IEEE/ACM International Symposium on Microarchitecture (MICRO-39), Dec. 2006, p. 347-358, IEEE, United States.
Jacob, B. et al., "Memory Systems: Cache, DRAM, Disk", Morgan Kaufmann Publishers, 2008, pp. 1-1017, Elseiver, United States.
Hur, I. et al., "A Comprehensive Approach to DRAM Power Management", Proceedings of the IEEE 14th International Symposium on High Performance Compute Architecture (HPCA 2008), Feb. 16-20, 2008, pp. 305-316, IEEE, United States.
Ipek, E. et al., "Self-Optimizing Memory Controllers: A Reinforcement Learning Approach", Proceedings of the International Symposium on Computer Architecture (ISCA), Jun. 2008, pp. 1-12, Beijing, China.
Isen, C. et al., "ESKIMO—Energy Savings using Semantic Knowledge of Inconsequential Memory Occupancy for DRAM subsystem", Proceedings of the 42nd Annual IEEE/ACM International Symposium on Microarchitecture (MICRO 42), Dec. 12, 2009, pp. 337-346, ACM, United States
Kim, Y. et al., "ATLAS: A Scalable and High-Performance Scheduling Algorithm for Multiple Memory Controllers", Proceedings of the 16th International Symposium on High Performance Computer Architecture (HPCA), Jan. 9-14, 2010, pp. 1-13, Carnegie Mellon University, School of Computer Science, United States
Kim, Y. et al., "Thread Cluster Memory Scheduling: Exploiting Differences in Memory Access Behavior", Proceedings of the 43rd Annual IEEE/ACM International Symposium on Microarchitecture (MICRO), Dec. 4-8, 2010, pp. 65-76, IEEE, United States.
Mutlu, O. et al., "Parallelism-Aware Batch Scheduling: Enhancing both Performance and Fairness of Shared DRAM Systems", Proceedings of the 35th Annual International Symposium on Computer Architecture (ISCA'08), Jun. 21, 2008, pp. 63-74, IEEE, United States.
Rixner, S. et al., "Memory Access Scheduling", Proceedings of the 27th Annual International Symposium on Computer Architecture (ISCA'00), Jun. 10, 2000, pp. 128-138, ACM, United States.
Lee, K-B., et al., "An Efficient Quality-Aware Memory Controller for Multimedia Platform SoC", Proceedings of the IEEE Transactions on Circuits and Systems for Video Technology, May 2005, pp. 620-633, vol. 15, Issue 5, IEEE, United States.
Martin, J. et al., "A Microprogrammable Memory Controller for High-Performance Dataflow Applications", Proceedings of the ESSCIRC 2009, Sep. 14-18, 2009, pp. 348-351, IEEE, United States.
Liu, S. et al., "Flikker: Saving DRAM Refresh-power through Critical Data Partitioning", Proceedings of the 16th International Conference on Architectural Support for Programming Languages and Operating Systems (ASPLOS XVI), Mar. 5, 2011, pp. 213-224, ACM, United States.
Stuecheli, J. et al., "Elastic Refresh: Techniques to Mitigate Refresh Penalties in High Density Memory", Proceedings of the 43rd Annual IEEE/ACM International Symposium on Microarchitecture (MICRO'10), Dec. 4-8, 2010, p. 375-384, IEEE, United States.

Zhang, Z. et al., "A Permutation-based Page Interleaving Scheme to Reduce Row-buffer Conflicts and Explout Data Locality", Proceedings of the 33rd Annual IEEE/ACM International Symposium on Microarchitecture (MICRO-33), Dec. 10-13, 2000, pp. 32-41, IEEE, United States.
Zheng, H. et al., "Mini-Rank: Adaptive DRAM Architecture for Improving Memory Power Efficiency", Proceedings of the 41st IEEE/ACM International Symposium on Microarchitecture (MICRO-41), Nov. 8-12, 2008, pp. 210-221, IEEE, United States.
Sherwood, T. et al., "Phase Tracking and Prediction", Proceedings of the 30th International Symposium on Computer Architecture (ISCA'03), Jun. 9, 2003, pp. 336-349, ACM, United States.
Bojnordi, M.N. et al., "PARDIS: A Programmable Memory Controller for the DDRx Interfacing Standards", Proceedings of the 39th Annual International Symposium on Computer Architecture (ISCA'12), Jun. 9-13, 2012, pp. 13-24, IEEE, United States.
Liu, F. et al., "Understanding How Off-Chip Memory Bandwidth Partitioning in Chip Multiprocessors Affects System Performance", Proceedings of the 16th International Symposium on High Performance Computer Architecture (HPCA'10), Jan. 9-14, 2010, pp. 1-12, IEEE, United States.
Falaki, H. et al., "Diversity in Smartphone Usage", Proceedings of the 8th International Conference on Mobile Systems, Applications, and Services (MobiSys'10), Jun. 15, 2010, pp. 179-194, ACM, United States.
Anonymous, "SPEC CPU 2006", Jun. 10, 2014, pp. 1-3, Standard Performance Evaluation Corporation, United States [downloaded from http://www.spec.org/cpu2006/ on Jun. 9, 2015].
Anonymous, "SIMICS Wind River Simics Full System Simulator" Jun. 2, 2010, pp. 1-11, Wind River, United States [downloaded from http://www.windriver.com/products/simics/ on Jun. 9, 2015].
Bienia, C. et al., "The PARSEC Benchmark Suite: Characterization and Architectural Implications", Princeton University Technical Report (TR-811-08), Jan. 2008, pp. 1-28, Princeton University, United States.
Chatterjee, N. et al., "USIMM: The Utah Simulated Memory Module", A Simulation Infrastructure for the JWAC Memory Scheduling Championship, Feb. 20, 2012, pp. 1-24, University of Utah and Intel Corporation, United States.
Albayraktaroglu, K. et al., "BioBench: A Benchmark Suite of Bioinformatics Applications", Proceedings of the IEEE International Symposium on Performance Analysis of Systems and Software (ISPASS'05), Mar. 20, 2005, pp. 1-8, IEEE, United States.
Osier, J., "GNU gprof", Jan. 1993, pp. 1-11, Free Software Foundation, Inc., United States [downloaded from https://web.archive.org/web/20000818063518/http://www.cs.utah.edu/dept/old/texinfo/as/gprof.html on Jun. 9, 2015].
Samsung Electronics Co. Ltd., "Samsung Apps", Sep. 17, 2010, pp. 1-2, Republic of Korea [http://www.samsung.com/us/appstore, downloaded from Internet Archive Wayback Machine on Jun. 9, 2015].
U.S. Non-Final Office Action for U.S. Appl. No. 13/865,959 mailed Jun. 22, 2015.
U.S. Notice of Allowance for U.S. Appl. No. 13/865,959 mailed Nov. 9, 2015.
U.S. Final Office Action for U.S. Appl. No. 13/865,959 mailed Sep. 8, 2015.

\* cited by examiner

APPLICATION DEFINED COMPUTING COMPONENT CONFIGURATION

CROSS-REFERENCE TO RELATED APPLICATIONS

This application claims the priority benefit of U.S. Provisional Patent Application Ser. No. 61/715,037, filed Oct. 17, 2012, incorporated herein by reference in its entirety.

TECHNICAL FIELD

One or more embodiments relate generally to optimizing computing components of electronic devices and, in particular, to optimizing computing components of electronic devices based on priorities for multiple criteria.

BACKGROUND

Computing systems ranging from smartphones to enterprise servers face a contradicting design requirement between quantity and application-specific quality. In order to lower costs, manufacturers are forced to artificially generalize users and their application requirements while designing or fabricating hardware components and devices.

SUMMARY

In one embodiment, a configurable computing system includes a broker module that receives information for one or more applications, obtains one or more attributes for an electronic device, and determines configurations for one or more components for the electronic device. A controller communicates with applications for configuring the one or more components based on the configurations.

Another embodiment provides a non-transitory computer-readable medium having instructions which when executed on a computer perform a method comprising: receiving information for one or more applications, obtaining one or more attributes for an electronic device, determining configurations for one or more components for the electronic device, and configuring the one or more components based on the determined configurations.

One embodiment provides an electronic device including a broker module that uses a processor for receiving information for one or more applications, obtaining one or more desired attributes for the electronic device, and determining one or more configurations for a set of computing components for the electronic device. A controller communicates with applications for configuring the set of computing components based on the one or more determined configurations.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to application defined computing (ADC) and application defined memory (ADM). One embodiment provides a configurable computing system including a broker module that receives information for one or more applications, obtains one or more attributes for an electronic device, and either statically or dynamically determines configurations for one or more components for the electronic device. In one embodiment, a controller communicates with applications for configuring the one or more components based on the configurations. In one embodiment, the configurable computing system may be deployed in a datacenter for use, for example, with servers. In other embodiments, the configurable computing system may be deployed for use in electronic devices, such as televisions, computers, tablets, cellular telephones, cameras, a personal digital assistant (PDA), wearable computing devices, wearable communication devices, etc. In one or more embodiments, the electronic components, such as processor(s), memory device(s), display, etc., may be customized for a specific electronic device using an embodiment of the configurable computing system. In one or more embodiments, the configurable computing system may be reprogrammed statically or dynamically based on application usage, demands, types, etc.

In one embodiment, the electronic devices comprise one or more mobile electronic devices capable of data communication over a communication link such as a wireless communication link. Examples of such mobile device include a mobile phone device, a mobile tablet device, wearable devices, etc.

Figure 1:
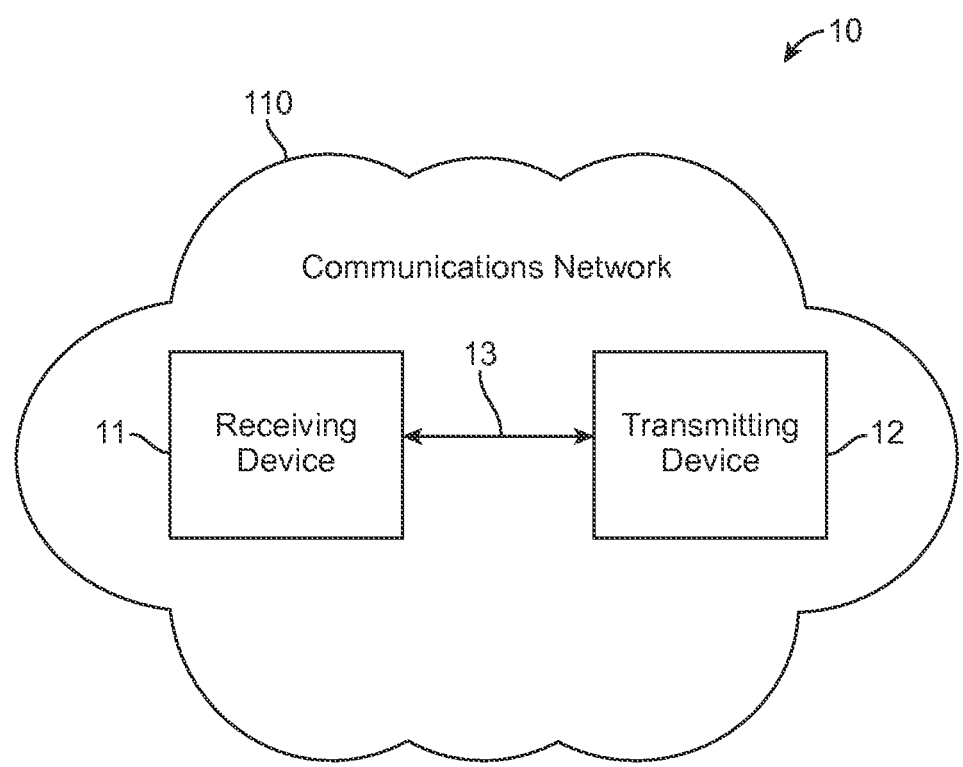
FIG. 1 shows a schematic view of a communications system, according to an embodiment.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a media player, a cellular telephone or a landline telephone, a personal e-mail or messaging device with audio and/or video capabilities, pocket-sized personal computers, PDAs, a desktop computer, a laptop computer, a datacenter computer, a server, a wearable electronic device, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
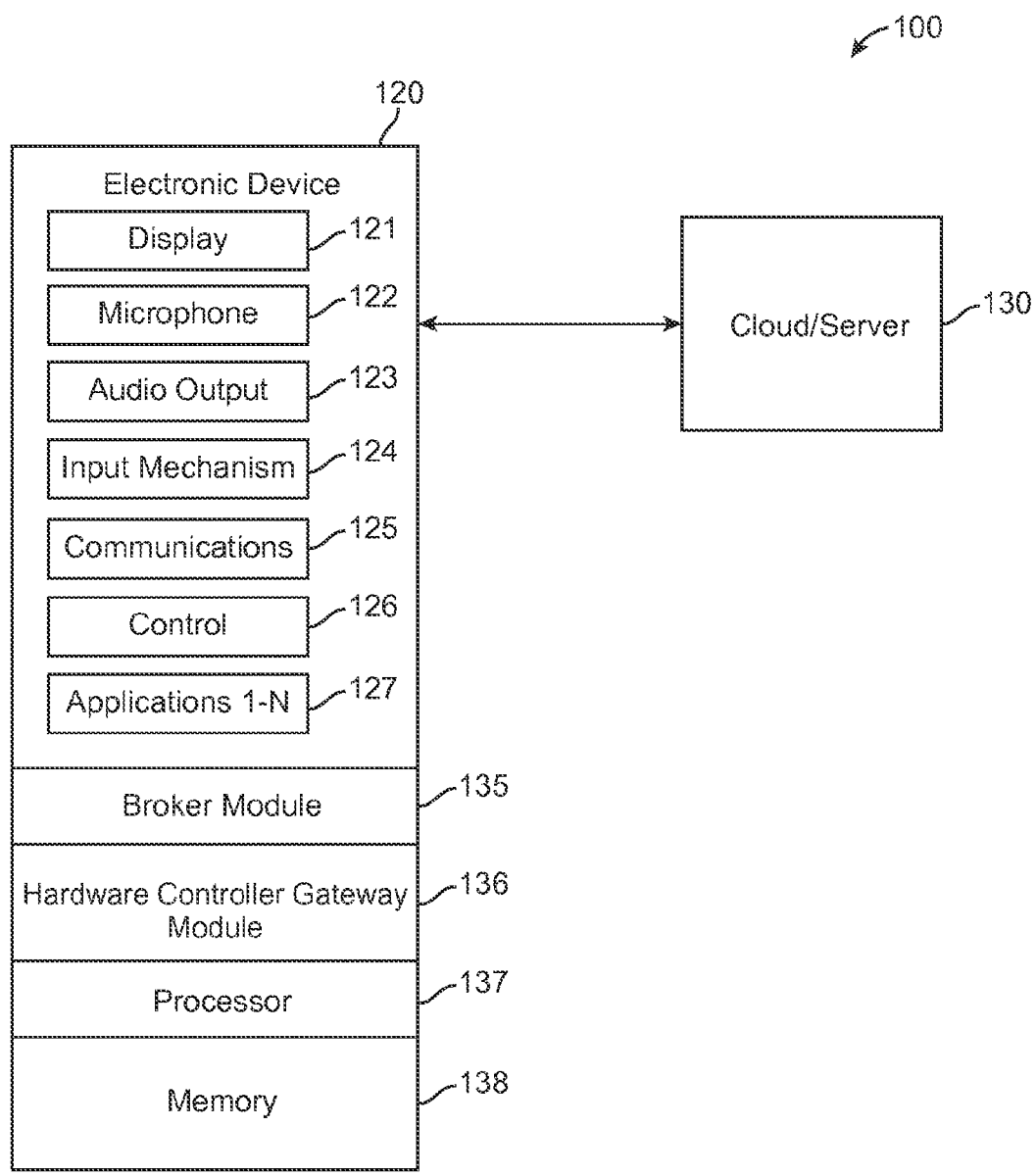
FIG. 2 shows a block diagram of an architecture system for employing application defined computing and application defined memory, according to an embodiment.

FIG. 2 shows a functional block diagram of an embodiment of an architecture system 100 employing a broker module 135, a hardware controller gateway module 136, a processor module 137 and a memory module 138, according to an embodiment. In one embodiment, the processor module 137 includes one or more processing devices. In one embodiment, the memory module 138 comprises one or more DRAM devices or other memory devices.

In one embodiment, the system 100 may be employed by an electronic device 120 that may communicate with a cloud or server device 130. In one embodiment, the electronic device comprises a display 121, and one or more applications that may execute on the electronic device 120, such as application 1-N 127, N being a positive integer.

In one embodiment, display 121 may be a separate device from the electronic device 120 or integrated with the electronic device 120.

In one embodiment, both transmitting device 12 and receiving device 11 may include some or all of the features of the electronic device 120. In one embodiment, the electronic device 120 may comprise a microphone 122, audio output 123, input mechanism 124, communications circuitry 125, control circuitry 126, a camera, a global positioning system (GPS) receiver module, and any other suitable components.

In one embodiment, all of the applications employed by display 121, input mechanism 124, the audio output 123 and communications circuitry 125 may be interconnected and managed by control circuitry 126.

In one embodiment, the audio output may include any suitable audio component for providing audio to a user of the electronics device 120. For example, the audio output may include one or more speakers (e.g., mono or stereo speakers) built into an electronics device 120. In some embodiments, the audio output may include an audio component that is remotely coupled to an electronics device 120. For example, the audio output may include a headset, headphones or earbuds that may be coupled to communications device with a wire (e.g., coupled to an electronics device 1-N 150 with a jack) or wirelessly (e.g., Bluetooth® headphones or a Bluetooth® headset).

In one embodiment, display 121 may include any suitable screen or projection system for providing a display visible to the user. For example, display 121 may include a screen (e.g., an LCD screen) that is incorporated in an electronics device 120. As another example, display 121 may include a movable display or a projecting system for providing a display of content on a surface remote from an electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to an electronics device 120. Input mechanism 124 may take a variety of forms, such as a button, keypad, dial, a click wheel, or a touch screen. The input mechanism 124 may include a multi-touch screen. The input mechanism may include a user interface that may emulate a rotary phone or a multi-button keypad, which may be implemented on a touch screen or the combination of a click wheel or other user input device and a screen.

In one embodiment, communications circuitry 125 may be any suitable communications circuitry operative to connect to a communications network (e.g., communications network 110, FIG. 1) and to transmit communications operations and media from an electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple an electronics device 120 with a Bluetooth® headset.

In one embodiment, control circuitry 126 may be operative to control the operations and performance of an electronics device 120. Control circuitry 126 may include, for example, a processor, a bus (e.g., for sending instructions to the other components of an electronics device 120), memory 138, storage, or any other suitable component for controlling the operations of an electronics device 120. In some embodiments, the processor module 137 may drive the display and process inputs received from the user interface. The memory 138 and storage may include, for example, DRAM, cache, Flash memory, ROM, and/or other RAM. In some embodiments, the memory 138 may be specifically dedicated to storing firmware (e.g., for device applications such as an operating system, user interface functions, and processor functions). In some embodiments, the memory 138 may be operative to store information related to other devices with which an electronics device 120 performs communications operations (e.g., saving contact information related to communications operations or storing information related to different media types and media items selected by the user).

In one embodiment, the control circuitry 126 may be operative to perform the operations of one or more applications 1-N 127 implemented on an electronics device 120. Any suitable number or type of applications may be implemented. Although the following discussion will enumerate different applications, it will be understood that some or all of the applications may be combined into one or more applications. For example, an electronics device 120 may include a voice recognition application, a dialog application, a map application, a media application (e.g., QuickTime, MobileMusic.app, or MobileVideo.app), etc. In some embodiments, an electronics device 120 may include one or several applications operative to perform communications operations. For example, an electronics device 120 may include a messaging application, a mail application, a chat application, a telephone application, a voicemail application, an instant messaging application (e.g., for chatting), a videoconferencing application, a fax application, or any other suitable application for performing any suitable communications operation.

In some embodiments, an electronics device 120 may include a microphone 122. For example, an electronics device 120 may include the microphone 122 to allow the user to transmit audio (e.g., voice audio) during a communications operation or as a means of establishing a communications operation or as an alternate to using a physical user interface. The microphone 122 may be incorporated in an electronics device 120, or may be remotely coupled to an electronics device 120. For example, a microphone 122 may be incorporated in wired headphones, or a microphone may be incorporated in a wireless headset.

In one embodiment, an electronics device 120 may include any other component suitable for performing a communications operation. For example, an electronics device 120 may include a power supply, ports or interfaces for coupling to a host device, a secondary input mechanism (e.g., an ON/OFF switch), or any other suitable component.

In one embodiment, a user may direct an electronics device 120 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, an electronic device 120 may comprise a mobile device that may utilize mobile device hardware functionality including: a GPS receiver module, a camera module, a compass module, and an accelerometer and gyroscope module. The GPS receiver module may be used to identify a current location of the mobile device (i.e., user). The compass module is used to identify direction of the mobile device. The accelerometer and gyroscope module is used to identify tilt of the mobile device.

In one embodiment, the system 100 provides the electronic devices 120 the ability to provide application defined computing (ADC) and application defined memory (ADM) for optimizing performance, energy saving, quality-of-service, etc. by customizing electronic component configurations. In one embodiment, ADM may include a programmable memory controller 610 (FIG. 6) that uses domain-specific instruction set architectures (ISAs), and implementation of the programmable memory controller 610 may meet the performance requirements of a high-speed DDRx interface.

One or more embodiments provide for optimizing all the components based on user's priorities on performance, energy, endurance and fault-tolerance. In one or more embodiment, the broker module 135 and the hardware controller gateway module 136 allow self-customizing components such as memory devices, processor(s), display etc., that are optimized to their own users. By using electronic device components that are statically or dynamically configurable, electronic devices may be manufactured at a reduced cost as compared to having to configure each electronic device based on user requirements, preferences, applications, etc.

One or more embodiments optimize application-specific quality of service by using information regarding software applications and for hardware components that may self-configure for holistically-configuring an electronic device 120 based on several runtime factors including, but not limited to, application access patterns, user preferences, and hardware profiles. The one or more embodiments apply an application brokered computing framework and use application defined computing concepts to create an application defined memory.

Memory capacity is a metric that determines the number of ways memory address mapping. Memory capacity grows exponentially, while the number of possible memory address mappings increases linearly. Memory address mapping affects both performance and energy-consumption of an application. DRAM devices have a wider range of address mappings possible (with larger capacity). As DRAM capacity grows, chances of selecting a non-optimal configuration and the accompanied penalty becomes problematic. Generic computing components do not provide application-specific quality of service.

Figure 3:
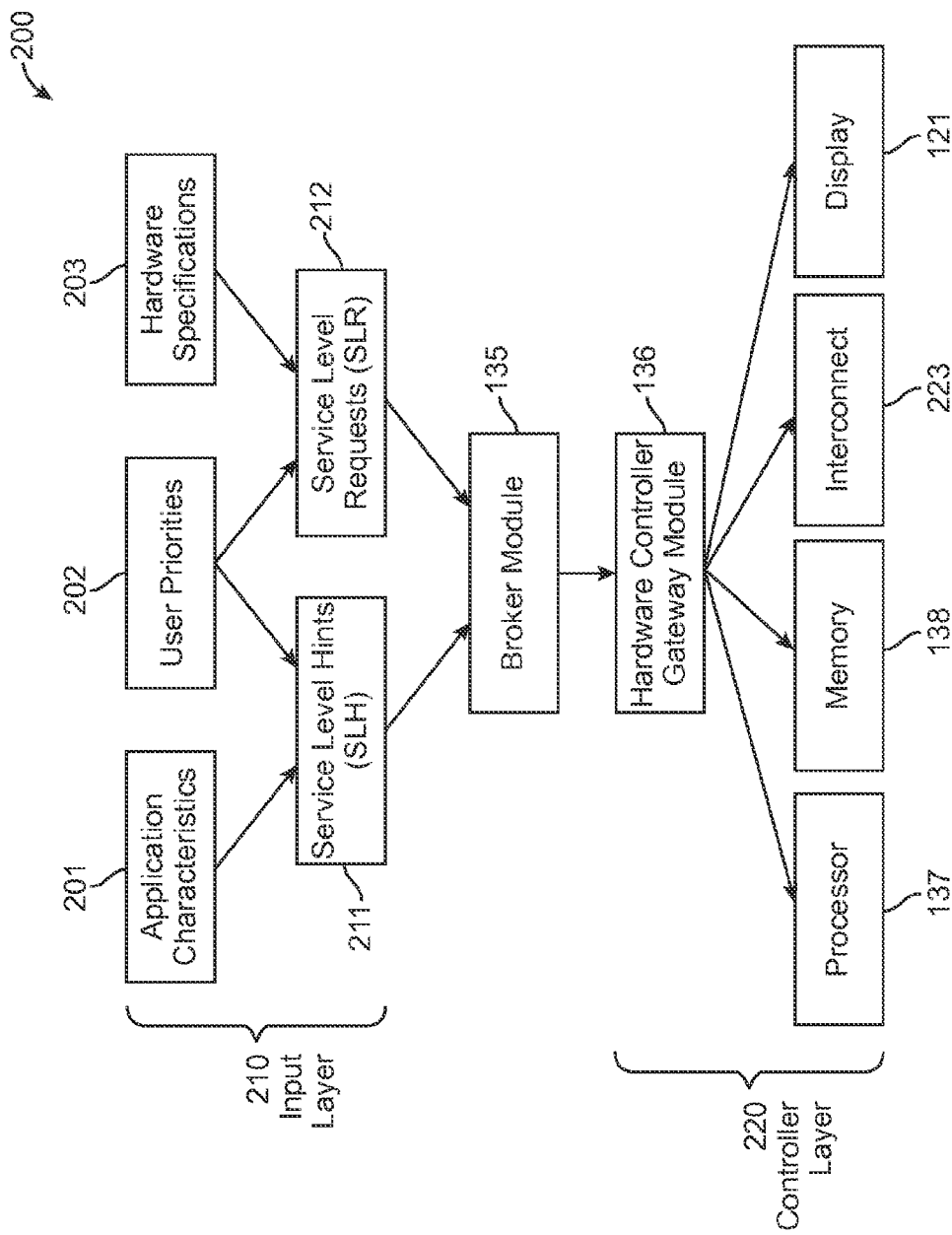
FIG. 3 shows an example architecture configuration for application defined computing, according to an embodiment.

FIG. 3 shows an example architecture configuration 200 for ADC, according to an embodiment. In one or more embodiments, the ADC architecture 200 comprises three major layers from a functional perspective. The input layer 210 includes the Service Level Hints (SLH) 211 and Service Level Requirements (SLR) 212 that provide input to the broker module 135 in the next layer (broker module 135 layer). The third layer is the controller layer 220 (i.e., gateway layer) to interact with other hardware components. In one embodiment, the SLH 211 receives information from application characteristics 201 and user priorities 202, which may include priorities for specific applications that are to be executed, energy savings, processing speed, display characteristics, etc. In one embodiment, the SLR 212 receives information from the user priorities 202 and hardware specifications 203. In one embodiment, the information from the user priorities 202 and hardware specifications 203 may be collected at either runtime, offline, or a combination of the two.

SLH 211 represents characteristics and access patterns from applications that may be used by the broker module 135 to optimize the application specific quality of service by determining/selecting computing component configurations. In one example embodiment, memory intensity of an application is an SLH 211 that determines the memory bandwidth requirements. In one embodiment, speculative hints received by the broker module 135 from SLH 211 are optional and need not be accurate. In this embodiment, while SLH 211 received using profiling helps in ADC, it is not a pre-requisite to have hints or profiling to take advantage of ADC. The broker module 135 may override those hints that it learns that are not useful, or ignore the hints that it determines could not be acted upon in a timely manner. In one embodiment, by making SLH 211 as an optional entry in ADC, traditional applications may take advantage of ADC without any change in application code.

In one embodiment, dynamic profiling of the runtime environment that may also predict the phase of the application is used. While computationally expensive, dynamic profiling provides most up-to-date information about an application in run-time. In one embodiment, static profiling may be used. In this embodiment, the broker module 135 may also receive its SLH 211 information by statically profiling an application. In one embodiment, existing profilers may be leveraged to obtain this information. In one example embodiment, the static profile for mobile applications in, for example, an android operating system, may be present in along with the manifest file for each application. When developers upload new applications into a cloud computing environment (e.g., cloud 130), such as Samsung Apps, the static SLH 211 may be derived and stored along with the applications.

In one embodiment, developers may use a standardized application programming interface (API) to communicate their SLH 211 information directly to the broker module 135. In one embodiment, even though additional efforts are required, more aggressive application specific quality of service may be attained by using an API. In one example embodiment, developers from large scale companies with data centers may leverage such a feature (i.e., using an API) in order to save energy and increase performance.

In one embodiment, SLR 212 describes the expectations of the user or administrator of a system along with additional facts about the system itself. In one embodiment, the term system is defined as the environment where the application is executed. In one embodiment, the system may be included in, part of, or a complete electronic device 120 (e.g., a smartphone, a server in a datacenter, a wearable device, etc.). In one embodiment, the user/administrator as referred to herein may be the person that is the end-user of an electronic device 120, or an administrator for a server in a datacenter. In one embodiment, SLR 212 may be set by the manufacturer of a consumer electronics device 120 that may then be altered manually by user or by software that learns about the user automatically.

In one embodiment, the user/administrator of the system may have requirements or quality expectations on several attributes of the system including energy, performance, endurance, scale (capacity) and fault-tolerance. In one example embodiment, the user/administrator of an electronic device 120 may have priority for energy and performance compared to other attributes, such as endurance, scale (capacity) and fault tolerance. These expectations on the infrastructure are referred to as SLR 212. In addition to the user/administrator's expectations on the system, SLR 212 may also include information about the system itself. In one embodiment, SLR 212 may have information if the execution environment is a mobile device or server, the type of processor, memory channel etc., which are essential for the broker module 135.

In one embodiment, the second layer in the ADC architecture 200 comprises the broker module 135 layer, including hardware and software components. In one embodiment, the broker module 135 uses SLH 211 and SLR 212 as inputs in choosing/determining a run-time configuration that optimizes application-specific quality of service. In one embodiment, the SLH 211 and SLR 212 play different roles in the broker module 135 layer. In one embodiment, the quality that is being achieved is determined by the SLR 212, which has the user/administrator's levels of priority for performance, energy, scalability, endurance and fault-tolerance. In one embodiment, the SLH 211 is system-agnostic and contains information about the application characteristics. Software's runtime performance is dependent on its hardware (or infrastructure). Therefore, in one embodiment, SLH 211 is synthesized with SLR 212 by the broker module 135 into a system-dependent SLH 211.

In one embodiment, the broker module 135 may work on the configuration of a system at system boot time or at the beginning of each application run, based on user/administrator's preference. In one embodiment, the SLH 211 is dynamically relied on by an application, and the broker module 135 also dynamically or statically changes its configurations. In one example embodiment, while changing configurations, the broker module 135 takes into consideration both time-to-change and cost-to-change between configurations and decides if it's beneficial to select a change in configuration.

In one embodiment, the broker module 135 controls configurations for multiple system components, such as memory devices of the memory module 138, application processor(s) (AP) of the processor module 137, the display 121 and graphics processor unit (GPU) that are registered (brokered) for application-specific quality, interconnect 223, etc. In one embodiment, since, each component may have multiple settings that are configured at runtime; the broker module 135 may use only a predetermined set of configurations to reduce the computational cost and time to change between system configurations.

In one embodiment, the broker module 135 determines and changes between configurations of the electronic components with minimal computational cost. Since each component (such as processor, memory, and display) is different, in one embodiment the broker module 135 may use different approaches for brokering between SLH 211, SLR 212 and other possible configurations for hardware components. In one example embodiment, the broker module 135 may be implemented in software, such as MATLAB software, based on a set of fuzzy logic rules and membership functions. In one embodiment, fuzzy logic is used in choosing an optimal memory scheduler for each application. In one embodiment, the broker module 135 uses fuzzy membership functions (for truth values) as "MOST_LIKELY," "MORE_LIKELY," "LESS_LIKELY," etc., for each possible scheduler. In one embodiment, the optimal selected scheduler has the largest crisp value as the result. In some embodiments, the broker module 135 predicts 100% correct results for test set data (with extreme scenarios). In one embodiment, the broker module 135 predicts the ratings for each memory scheduling algorithm with equal weighting for performance and power (50%:50%). In some embodiment, fuzzy logic is not used as the rules used are very crisp and binary.

In one embodiment, the broker module 135 communicates the new selected configuration to the respective components/parts of the system. In one embodiment, the third layer (i.e., controller layer 220) in the ADC architecture 200 comprises the hardware controller gateway module 136 that coordinates and communicates with each of the target devices (such as memory of the memory module 138, processors of the processor module 137, display 121, interconnect 223, etc.). In some embodiments, the hardware controller gateway module 136 may also gather feedback that is useful for the broker module 135.

In some embodiment, the hardware controller gateway module 136 is either an interface to an existing device controller or a separate additional controller that allows the electronic device 120 to be controlled by the broker module 135. In one embodiment, the hardware controller gateway module 136 allows the broker module 135 to program the device controllers to a desired configuration.

Figure 4:
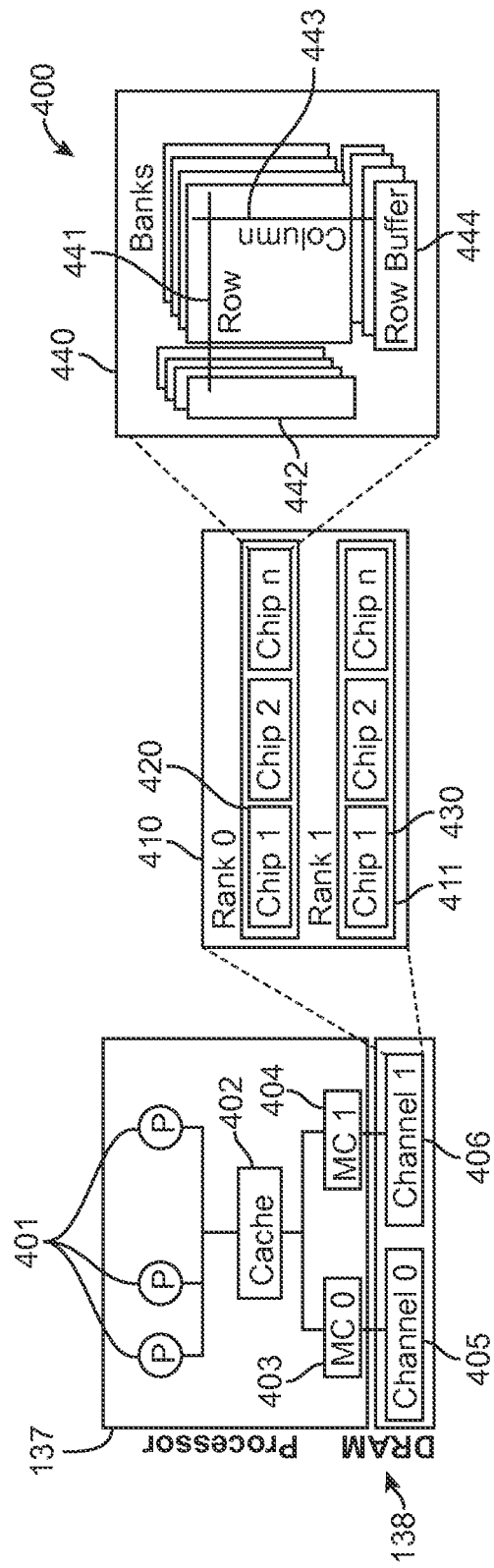
FIG. 4 shows an architecture for a dynamic random access memory (DRAM) device, according to an embodiment.

FIG. 4 shows an architecture 400 for a chip including a DRAM device for memory module 138 that may be used with an embodiment. In one embodiment, the memory module 138 includes one or more DRAM devices that use ADC in creating an application defined memory (ADM). In some computer systems, multiple cores 401 of the processor module 137 are connected to a memory hierarchy consisting of different levels of private/shared caches 402 and shared main memory devices of the memory module 138. In one embodiment, main memory (i.e., the DRAM device of memory module 138) is controlled by a memory controller (MC) (i.e., MC 0 403 and MC 1 404), which connects the last level of the cache 402 to the main memory through memory channels (i.e., channel 0 405, channel 1 406). DRAM may be a current dominant technology for off-chip memories in computer systems.

As shown in FIG. 4, the architecture 400 is organized hierarchically. In one embodiment example, the architecture 400 comprises one to four memory channels (e.g., Channel 0 405, Channel 1 406, etc.), one to four ranks per channel (e.g., rank 0 410 with chips 420, rank 1 411 with chips 430, etc.), and up to 16 banks 440 per rank. The highest parallelism in DRAM hierarchy is achieved at the channel level, where the memory is divided into multiple parts, each of which is controlled by a memory controller (e.g., MC 0 403, MC 1 404). In one example embodiment, the architecture 400 comprises an SDRAM chip including multiple independent memory banks 440 such that memory requests to different banks may be serviced in parallel. In one embodiment example, a DRAM bank 440 is accessed using a global bank ID comprising channel, rank, and bank fields. In one embodiment example, each DRAM bank 440 is organized as a two-dimensional array of DRAM cells, including of multiple rows 441 and columns 443, with a row-buffer 444 and a column-buffer 442. A memory location inside the DRAM bank 440 is thus accessed using row 441, and column 443 IDs.

In one example embodiment, because of physical limitations, only one row 441 in a bank 440 may be accessed at any given time. The row 441 is stored in sense amplifiers known as the row-buffer 444 prior to a column 443 access. In one embodiment, each row 441 is dedicated to a single bank 440. In some embodiments, tens of cache lines are stored in a row buffer 444 (an example row buffer 444 size is 1-2 KB). In one embodiment, to load a row 441 from the memory array to the row buffer 444, known as opening a row 441, an activate command must first be issued. In one embodiment, then read/write commands may be issued to access data. Therefore, in some embodiments, DRAM access latency depends on whether the requested row 441 is already in the row buffer 444 or not. Based on contents of the row buffer 444 and state of the target bank 440, a DRAM request falls into one of the following categories: Row-buffer hit, Row-buffer closed or Row-buffer conflict.

In one embodiment, for a row-buffer hit, the requested data is currently in the row buffer 444. Therefore, a single read/write command is required to start DRAM data transfer. In one embodiment, the lowest possible bank access latency, called tCAS, is enforced by the DRAM subsystem to apply a column access strobe to the DRAM device. In one embodiment, for a row-buffer closed category, no row 441 is loaded from the DRAM to the row buffer 444. In one embodiment, in this case an activate command is required to open the row 441 followed by a column access command. The access latency for both row 441 and column 443 access is tRCD+tCAS.

In one embodiment, for a row-buffer conflict category, the row buffer 444 is loaded by a row 441 different from the required row for accessing. In one embodiment, in this case, the row buffer 444 first needs to be written back to the memory array by a pre-charge command; then, the required row 441 needs to be opened and accessed using an activate and a column access command. Therefore, the highest bank access latency formed is tRP+tRCD+tCAS. In one embodiment, for all three categories above, transferring a burst of data from/to the DRAM system over a data bus follows the column access strobe (CAS). The data transfer latency depends on the burst length (BL) and the clock frequency of the data bus. DRAM cells may suffer from a short retention problem. In particular, stored data (charge) in a DRAM cell decays over time even if it doesn't undergo a read operation.

In order to preserve data (charge) in a DRAM cell, it must be rewritten using refresh operations at a certain rate, which is specified as refresh interval for DRAM devices. A refresh operation issued to a DRAM bank 440 blocks all other DRAM commands while refresh is undergoing; therefore, it becomes expensive in terms of power consumption and system.

Different DRAM products targeting at different objectives have been introduced due to significant impact of DRAM timing constraints and organization on both power and performance of computer systems. These products are basically optimized in terms of power and performance for generic application domains. For example, DDRx is used for desktop and server class machines; GDDRx is specialized for graphic boards and embedded systems; and LPDDRx is optimized for low-power applications in mobile and embedded systems. Even though these DRAM devices use relatively optimized structures with different requirements, they still enforce specific timing constrains that limit system efficiency. Existing domain specific DRAM products, such as GDDRx, LPDDRx, and DDRx, are equipped with fixed configurations. Due to the limited knowledge of each application at hardware level, these products still suffer from artificial generalization within each domain. Therefore, they are not able to efficiently provide application specific quality of service that follows different goals with different characteristics.

Figure 5:
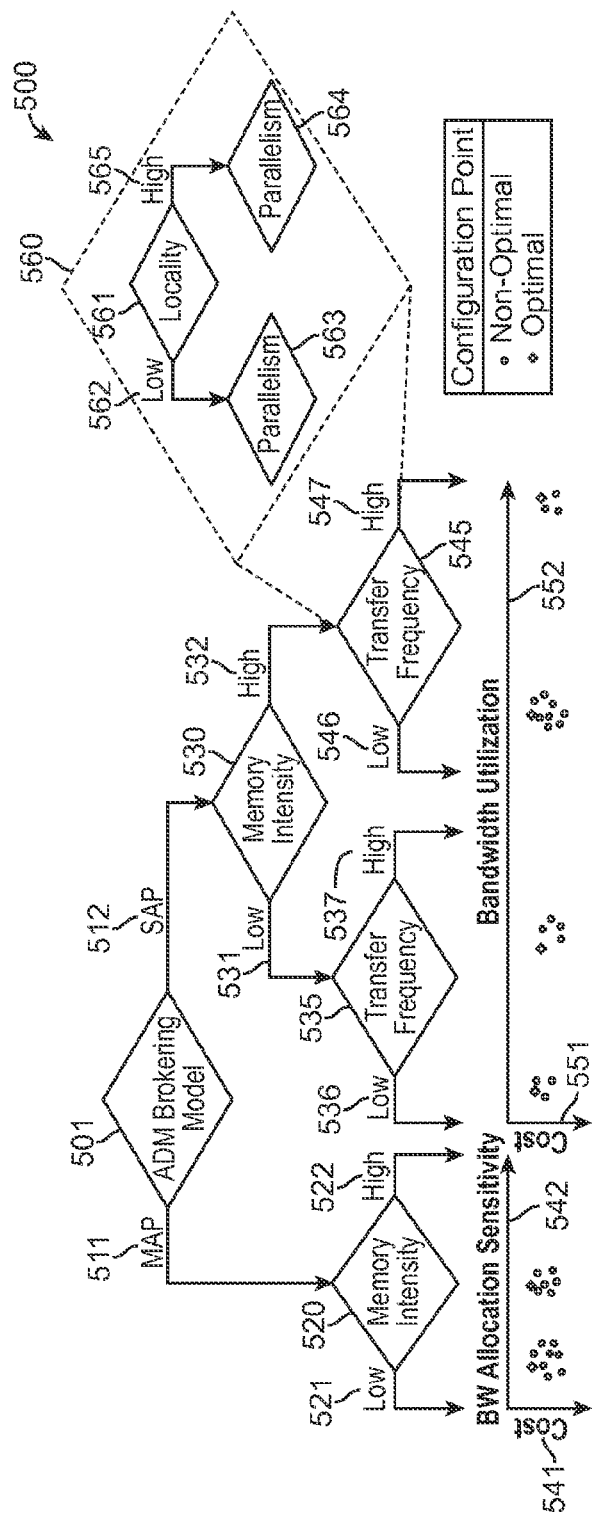
FIG. 5 shows a flow diagram for a memory model based on user demands from an application, according to an embodiment.
Figure 6:
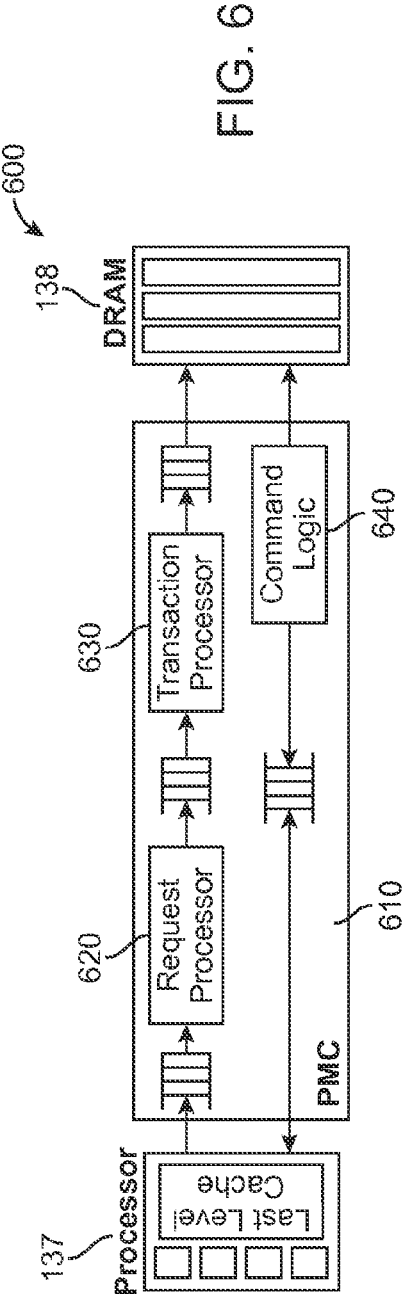
FIG. 6 shows an example of an architecture including a processor coupled to a DRAM device and a programmable memory controller, according to an embodiment.

FIG. 5 shows a flow diagram 500 for an ADM memory model based on user demands from an application, according to an embodiment. In one embodiment, an ADM memory brokering model or module 501 for DRAM specialization is employed, applying the ADC solution to DRAM subsystems for high memory efficiency and performance. In one embodiment, to build an ADM system, the ADM brokering model 501 is used with a programmable memory controller (PMC) 600 (FIG. 6). In one embodiment, the ADM brokering model 501 classifies applications based on their characteristics to choose optimal memory control configurations. In one embodiment, the PMC 600 implements these configuration functions in firmware. In one embodiment, the ADM brokering model 501 and PMC 600 are implementations of the broker module 135 and the hardware controller gateway module 136 (FIG. 3), respectively.

One or more embodiments using the ADM brokering model 501 improve memory system power, performance, energy, and inherently change the application specific quality by employing efficient address mapping and command scheduling processes. In one embodiment, address mapping configuration transforms the linear physical address space to hierarchical DRAM coordinates. In one embodiment, scheduling processes reorder memory requests presented to DRAM banks. In one embodiment, address mapping and scheduling maximize the row-buffer hit rate and leverage bank-level parallelism for optimizing the performance and power efficiency of DRAM devices in the electronic device 120.

In one embodiment, scheduling policies directly manage the DRAM device bandwidth. In one embodiment, the management of the DRAM device(s) is critical to power and performance, thereby profoundly affecting the quality of memory service from the user's point of view. In one embodiment, the ADM brokering model 501 considers two different aspects of memory bandwidth from the applications' viewpoint; namely, bandwidth utilization and bandwidth allocation. As shown in FIG. 5, the ADM brokering model 501 is shown with an abstract classification model for user applications based on memory demands. Based on this model, user-defined quality of service for running applications falls into two categories, single-application priority (SAP) 512 and multiple-application priority (MAP) 511.

In one embodiment, for the SAP 512 category, a user is more interested in either running a single application or prioritizing that application over other applications in a multi-programmed environment. Hence, efficiently utilizing the memory bandwidth becomes an important optimization metric. For example, in a smartphone that runs a gaming application most of its time. In one embodiment example, the SAP 512 target may be the specific gaming application; therefore, system optimization may mainly focus on that gaming application to address power and performance problems. As shown FIG. 5, bandwidth utilization 552 is defined based on two different metrics: Memory Demand Intensity (MDI) 520/530 and Data Transfer Frequency (DTF) 535/545.

In one embodiment, MDI 520/530 is a characteristic of an application that is measured based on memory accesses per unit time generated by the application when running. In one embodiment, MDI 520/530 is measured and reported as the number of memory accesses per instruction (MAPI). In one embodiment, DTF 535/545 determines the ability that a particular DRAM configuration is able to serve a particular application. In one embodiment, DTF 535/545 comprises a metric based on DRAM spatial locality 561 and bank-level parallelism 563. In one embodiment, spatial locality 561 defines the application's ability to visit similar DRAM locations consecutively with low overhead. In one embodiment, bank-level parallelism 563/564 defines the application's ability to have an outstanding of concurrent memory accesses to different locations with DRAM.

In one embodiment, DTF 535/545, unlike MDI 520/530, depends on both application behavior and hardware characteristics. In one example embodiment, DTF 535/545 is significantly influenced by internal DRAM resource management. In this example embodiment, if a DRAM address mapping function assigns DRAM resources to memory requests such that it achieves relatively high bank-level 565 parallelism 564 and spatial locality, DRAM timing constraints that are enforced by the memory subsystem of memory module 138 may be minimized. In one embodiment, decreasing the timing constraints results in serving memory requests more frequently, therefore, DTF 535/545 increases. Both locality 561 and bank-level parallelism (low 562/563, high 565/564) depend on the number of DRAM global banks 440, row buffer 444 size, and address mapping function. In one embodiment, the bandwidth utilization is proportional to DTF 535/545 (locality and bank-level parallelism 560) as well as MDI 520/530. In one embodiment, the ADM brokering model 501 determines the required thresholds for MDI 520/530 and DTF 535/545 to classify different applications.

The bandwidth utilization not only depends on application behavior, but is also limited by hardware constraints. Different hardware configurations have demand for different costs—e.g. delay, throughput, energy, power, retention time, and fault tolerance. This is represented as a two dimensional space based on bandwidth (e.g., bandwidth allocation sensitivity 542, bandwidth utilization 552) and cost (541, 551) in FIG. 5. In one or more embodiments, for each application, different sets of the configurations are available that have different costs. In one embodiment, the ADM brokering model 501 may select the best set of configurations to optimize the memory system for a single application.

In one embodiment, the ADM brokering model 501 determines whether user priority is MAP 511 or SAP 512. In one embodiment, for the MAP 511 category, the ADM brokering model 501 determines the MDI 520 threshold as either low 521 or high 522 and may determine or select a configuration based on the MDI 520 determination. In one embodiment, for the SAP 512 category, the ADM brokering model 501 determines the MDI 530 threshold as either low 531 or high 532. In one embodiment, for the case where the determination is for the low 531 MDI 530, the ADM brokering model 501 determines the DTF 535 as either low 536 or high 537, and may determine or select a configuration based on the DTF 535 determination. In one embodiment, for the case where the MDI 530 determination is for the high 532 threshold, the ADM brokering model 501 determines the DTF 545 as either low 546 or high 547, and may determine or select a configuration based on the DTF 545 determination.

In one embodiment, for the MAP 511 category, the user is interested in improving the quality of running multiple applications in terms of deferent metrics—e.g., total execution time, longest execution time, energy, power, and fairness. Therefore, in one embodiment, managing the shared memory bandwidth among interesting applications becomes a key component in improving overall system performance from the applications' point of view. In one example embodiment, on a desktop computer, a user may only be interested in running a specific word processing application and a music player. In this example embodiment, the quality of serving the memory requests from these applications may be defined proportional to the intensity of their demands—i.e., an optional definition of fairness in memory systems. In one embodiment, other than bandwidth allocation policies, system configuration also affects the quality of service that appears in terms of cost in the ADM brokering model 501 implementation. In one embodiment, memory intensity of the set of interesting applications determines the sensitivity of the bandwidth allocation policy. In this embodiment, as the intensity increases, the bandwidth allocation sensitivity increases.

FIG. 6 shows an example of an architecture 600 including a processor module 137 coupled to a DRAM device of memory module 138 by a PMC 610, according to an embodiment. In one embodiment, in using an ADM architecture, the hardware controller gateway module 136 is required to apply the decisions made by the broker module 135. Unlike existing fixed-function DRAM controllers that use a common control algorithm (e.g., address mapping or command scheduling) for all applications, in one or more embodiments the PMC 610 provides a flexible framework that enables application-specific optimizations and brokering of memory control policies. In one embodiment, using the PMC 610 makes it possible to perform upgrades to existing control algorithms. In one embodiment, the PMC 610 considers three critical challenges: scheduling throughput, request processing latency, and power consumption.

In one embodiment, the PMC 610 is a fully programmable controller that receives read/write requests from the last-level cache of the processor module 137, and manages DRAM data and command processing to optimize application-defined objectives. In one embodiment, the PMC 610 internally comprises a request processor 620, a transaction processor 630, and command logic 640. In one or more embodiments, the PMC 610 delivers competitive performance with fixed-function controllers by virtue of employing domain-specific instruction set architecture (ISA) for memory request/transaction processing. In one embodiment, at 22 nm technology, the PMC 610 operates at 2 GHz dissipating only 152 mW peak power.

In one embodiment, the request processor 620 is primarily responsible for memory address mapping. In one embodiment, upon arrival at the memory controller, each request is enqueued at a FIFO request queue interfaced to the request processor 620. In one embodiment, the request processor 620 dequeues the next request at the head of the request queue, generates a set of DRAM coordinates—channel, rank, bank, row, and column IDs—for the requested address, and creates a new memory transaction with the generated coordinates, to be enqueued in a transaction queue.

In one embodiment, the transaction processor 630 is primarily responsible for command scheduling. In one embodiment, the transaction processor 630 operates on the memory transactions in the transaction queue, and emits a sequence of DRAM commands that achieves performance, energy, and quality-of-service goals. In one embodiment, the transaction processor 630 has an ISA that offers several important capabilities. In one embodiment, a subset of the instructions, called transaction management instructions, allows the firmware to classify memory requests based on the state of the memory subsystem (e.g., requests that need a pre-charge), the request type (e.g., a write request), and application-specific criteria (e.g., thread IDs) to derive a high-performance, efficient command schedule. In one embodiment, a second subset of the instructions, called command management instructions, allows the firmware to emit either the next required command for a given transaction (e.g., an activate command to a particular row), or a new command for various DRAM management purposes (e.g., power-management or refresh scheduling). In one embodiment, commands that are emitted by the transaction processor 630 are placed in a FIFO command queue, which in turns are processed by the command logic 640.

In one embodiment, the purpose of the command logic 640 is to inspect the generated command stream, checking—and if necessary, stalling—the command at the head of the command queue to ensure all DRAM timing constraints are met. In one embodiment, the command logic 640 provides configurable tables specifying the DDRx timing constraints, thereby making it possible to interface the PMC 610 to different memory subsystems—e.g., DDRx, LPDDRx, and GDDRx. Since the command logic 640 enforces all timing constraints and guarantees the timing correctness of the scheduled command stream, in one embodiment by using the command logic 640 it becomes possible to separate timing correctness from performance optimization. This separation allows delivering comparable throughput to fixed-function controllers.

In one example embodiment, ADM is applied using the ADM brokering model 501 implemented with the broker module 135 and the PMC 610 implemented with the hardware controller gateway module 136 and system-level simulations are analyzed. The simulations show server and mobile platforms across a variety of benchmarks from commercial, multimedia, server, and biology fields. In the one or more example embodiments, the optimization objectives are mainly defined as system performance, energy-efficiency, and fairness. Table I shows server and power setup for the simulations used for one or more embodiments.

TABLE I.1

| Server and Power Setup | | |
|---|---|---|
| Processor clock speed | 3.2 GHz | 1.6 GHz |

TABLE I.1-continued

Server and Power Setup

| Processor reorder buffer size | 160 | 64 |
|---|---|---|
| Processor pipeline depth | 10 | 15 |
| Memory frequency | 800 MHz | 533 MHz |
| Memory Protocol | DDR3 DIMM | LP-DDR2 MCP Stack |
| DRAM channels | 4 | 2 |
| DRAM ranks per channel | 4 | 1 |
| DRAM banks per ranks | 8 | 8 |
| DRAM rows per bank | 16384 | 32768 |
| DRAM cache lines per row | 128 | 128 |
| Similar DRAM Part No. | Samsung M378B5773EB0 | Samsung K3PE7E700M-XGC2 |

In one example embodiment, a simulation model acts as the broker module 135, SLH 211 and SLR 212 are manually fed into the simulation model, and system performance and energy efficiency are modeled in detail using a cycle-accurate trace-based simulator based on Utah simulated memory module (USIMM). In one example embodiment, the simulator takes multiple workloads as input to simulate the processor functions using an out-of-order multi-core processor model with a reorder buffer (ROB) per each core. In one example embodiment, to model DRAM performance and power, DRAM timing constraints of interest and current values from commercial products were obtained. In one example embodiment, USIMM reports execution time and energy-delay product for each simulation. In one example embodiment, some of the publically available workloads are run on servers in a cloud-based data center.

In one or more example embodiments, different system configurations for server and mobile devices are analyzed and results are shown in FIGS. 7-13. In one example embodiment, the server setup is equipped with a quad-core SPARC-like processor operating at 3.2 GHz that is connected to a four-channel of DDR3-1600 DRAM. In one example embodiment, the mobile setup is equipped with a dual-core Exynos5-like processor operating at 1.6 GHz that is connected to a two-channel LP-DDR2-1066 DRAM (see Table I.1I for details).

In one or more example embodiments, seventeen applications from four benchmark suites are evaluated using the ADM architecture for brokering configurations of components for optimization. The applications of the example embodiments represent a diversified selection of both cloud and mobile computing requirements in today and expected for the future. In one example embodiment, seven applications (face, fluid, ferret, freq, stream, swapt, and canneal) are selected from Princeton Application Repository for Shared-Memory Computers (PARSEC) focusing on emerging multi-threaded workload. In one example embodiment, two applications (tigr and mummer) are selected from BioBench that focus on data mining over gene-based big-data. In one example embodiment, Two applications (lesline and libq) are used from the Standard Performance Evaluation Corporation (SPEC), namely from SPECCPU2006, that are used for representing CPU-intensive, server and desktop applications. In one example embodiment, five commercial workloads (comm1 to comm5) from a USIMM package are used for evaluation.

In one embodiment, four state-of-the-art memory schedulers are selected for evaluation and are compared to first come first served (FCFS) scheduling policy that is used as a baseline scheduler. In one or more example embodiments, the four schedulers are: Fine-Grain Compute-Phase-Prediction (CPP), Write-Drain-Optimized first ready (FR)-FCFS (FR-FCFS), Gain-Estimation-Optimized Thread-Clustering (TCS), and Thread-Fair FR-FCFS (TF-FCFS).

In one example embodiment, Fine-Grain CPP assumes that applications run in different phases (i.e., computation-intensive and memory-intensive) and dynamically detects the application phases at runtime. In one or more embodiments, among different applications (or threads), the Fine-Grain CPP scheduler prioritizes memory requests from a computation-intensive thread over others. The Fine-Grain CPP scheduler requires high computation power at the memory controller for making decisions.

In one example embodiment, the FR-FCFS scheduler relies on optimizing row buffer hit rate based on conventional FR-FCFS. In one example embodiment, instead of strictly prioritizing read requests over write requests, the FR-FCFS scheduler switches between read and write requests to reach higher row buffer hit rate.

In one example embodiment, the Gain-Estimation-Optimized TCS scheduler is designed based on a Thread-Clustering Memory (TCM) scheduler, which prioritizes computation-intensive threads over other threads at coarse grain. In one example embodiment, a program counter gain history table is employed to estimate the program due to satisfying memory requests. In one example embodiment, the Gain-Estimation-Optimized TCS scheduler prioritizes threads with higher program counter gain. In one example embodiment, the Gain-Estimation-Optimized TCS scheduler requires relatively large local storage for thread booking.

In one example embodiment, the TF-FCFS scheduler, based on FR-FCFS, uses a round-robin policy in case there is no row buffer hit, and thus, a new row that needs to be activated. In one or more embodiments, the full address mapping design space is evaluated. Different global bank IDs from the memory physical addresses are considered to maximize row buffer locality as well as bank level parallelism.

In one or more embodiments, Applications are profiled based on mobile and server setups (e.g., electronic devices 120) and then the ADM brokering module 501 selects an appropriate memory scheduler and address mapping scheme according to the user-defined service quality. In one example embodiment, to create SLH 211, all benchmarks are executed with Windriver Simics, and its g-cache module to produce the traces. In one example embodiment, the memory traces are analyzed based on the ADM brokering model 501 to extract four metrics. Three metrics are used to determine the scheduling policy given an address mapping: MAPI, row buffer hit rate, and global bank imbalance factor. One metric is used to determine the address mapping: best global bank ID. In one example embodiment, all of the applications are classified based on their relative numbers on each metric. The classification correlates to the configuration of the system, and the server configuration classification is summarized in Table II.

TABLE II

Application Configurations

| | MAPI | Row buffer hit rate | Global bank level parallelism | Best Global bank ID |
|---|---|---|---|---|
| face | HIGH | HIGH | HIGH | 14 |
| libq | HIGH | HIGH | HIGH | 15 |
| ferret | HIGH | LOW | HIGH | 12 |
| MT canneal | HIGH | LOW | LOW | 12 |
| mummer | HIGH | LOW | LOW | 16 |
| tigr | HIGH | LOW | LOW | 16 |

TABLE II-continued

Application Configurations

| | MAPI | Row buffer hit rate | Global bank level parallelism | Best Global bank ID |
|---|---|---|---|---|
| comm2 | HIGH | LOW | LOW | 18 |
| comm4 | LOW | HIGH | HIGH | 12 |
| leslie | LOW | HIGH | HIGH | 19 |
| comm1 | LOW | HIGH | LOW | 13 |
| fluid2 | LOW | HIGH | LOW | 25 |
| fluid | LOW | LOW | HIGH | 16 |
| comm5 | LOW | LOW | LOW | 12 |
| freq | LOW | LOW | LOW | 13 |
| stream | LOW | LOW | LOW | 13 |
| swapt | LOW | LOW | LOW | 14 |
| comm3 | LOW | LOW | LOW | 17 |

In one example embodiment, based on the server setup, the classification threshold is selected based on application behaviors. In one example embodiment, MAPI is classified into two segments, and the threshold for MAPI (number of memory access per hundred instructions) is 1. In one example embodiment, the threshold for row buffer hit rate is 20, which is profiled as the average number of row buffer hits given an instruction window equal to the size of the ROB of the whole processor. In one example embodiment, the threshold for the global bank imbalance is set at 12, which is profiled as the maximum difference between the numbers of accesses to different banks given an instruction window of ROB. The above profiling also provides the base for creating multi-programmed application executions.

In one or more embodiments, the ADM brokering model 501 is able to consider SLH 211 from application profiling, and choose the best memory scheduling algorithm and address mapping policy. In one example server embodiment, the address mapping is fixed and the embodiment demonstrates that the broker module 135 selects the best memory scheduling algorithm out of the four candidates. Performance improvement and energy saving are achieved based on the broker module 135. In one or more example embodiments, results indicate that TF-FCFS scheduling performs better than the other schedulers for those applications with high memory intensity and relatively low data transfer frequency. TCS, however, shows better performance for the applications with low memory intensity and low data transfer frequency. For the applications with low memory intensity and relatively high data transfer frequency, FR-FCFS is the best option. CPP, instead, performs very well in terms of performance and energy for the rest of applications.

Figure 7:
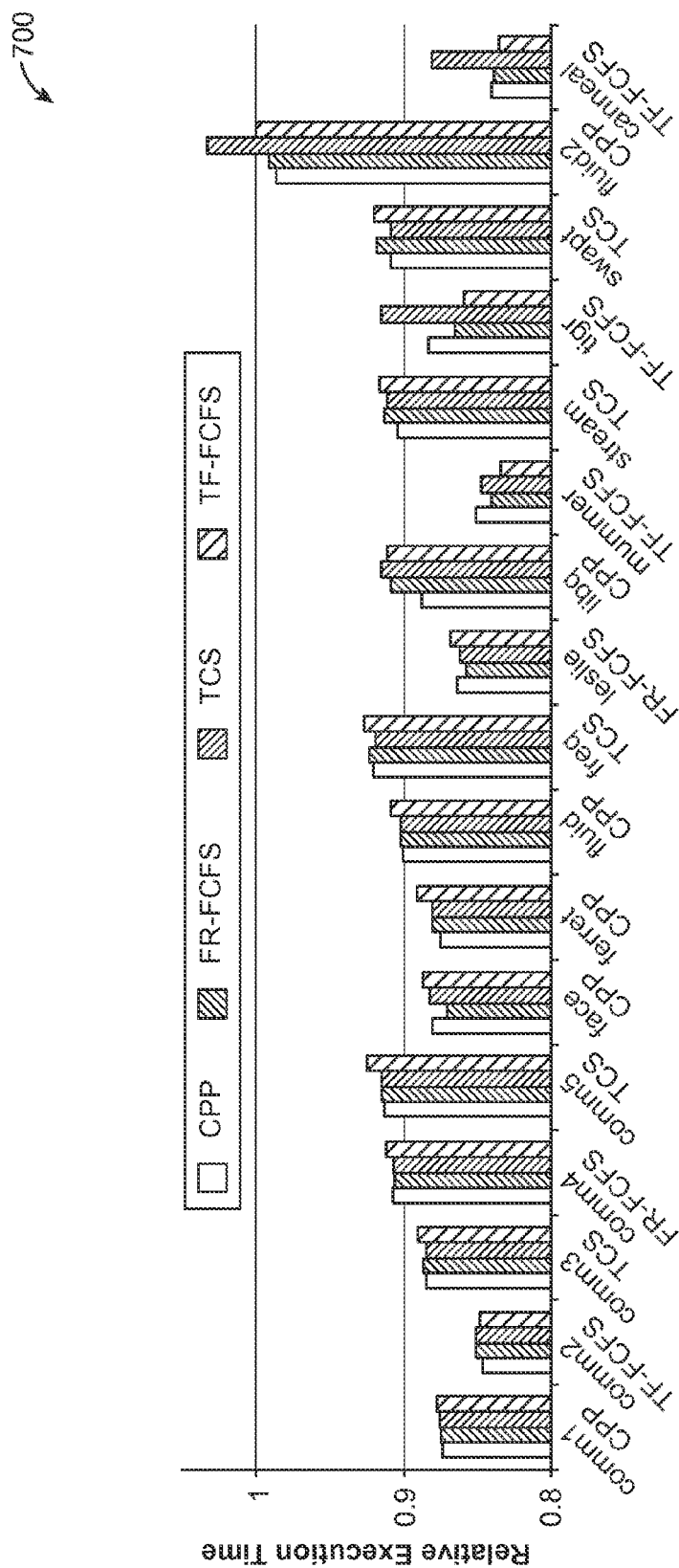
FIG. 7 shows a graph of relative performance of different scheduling processes, according to an embodiment.

FIG. 7 shows a graph 700 of relative performance of different scheduling processes, according to an example embodiment. Graph 700 compares execution time of different applications while applying the four schedulers, and the choice of scheduler by the broker module 135 on the bottom of the graph 700. In one embodiment, in thirteen out of seventeen benchmarks, the example embodiment broker module 135 selects the best schedulers. On average, the scheduler selected may shorten the execution time by 11.3%. Comparing with randomly picked scheduling algorithms, up to 5.6% performance improvement may be achieved by one or more example embodiments.

Figure 8:
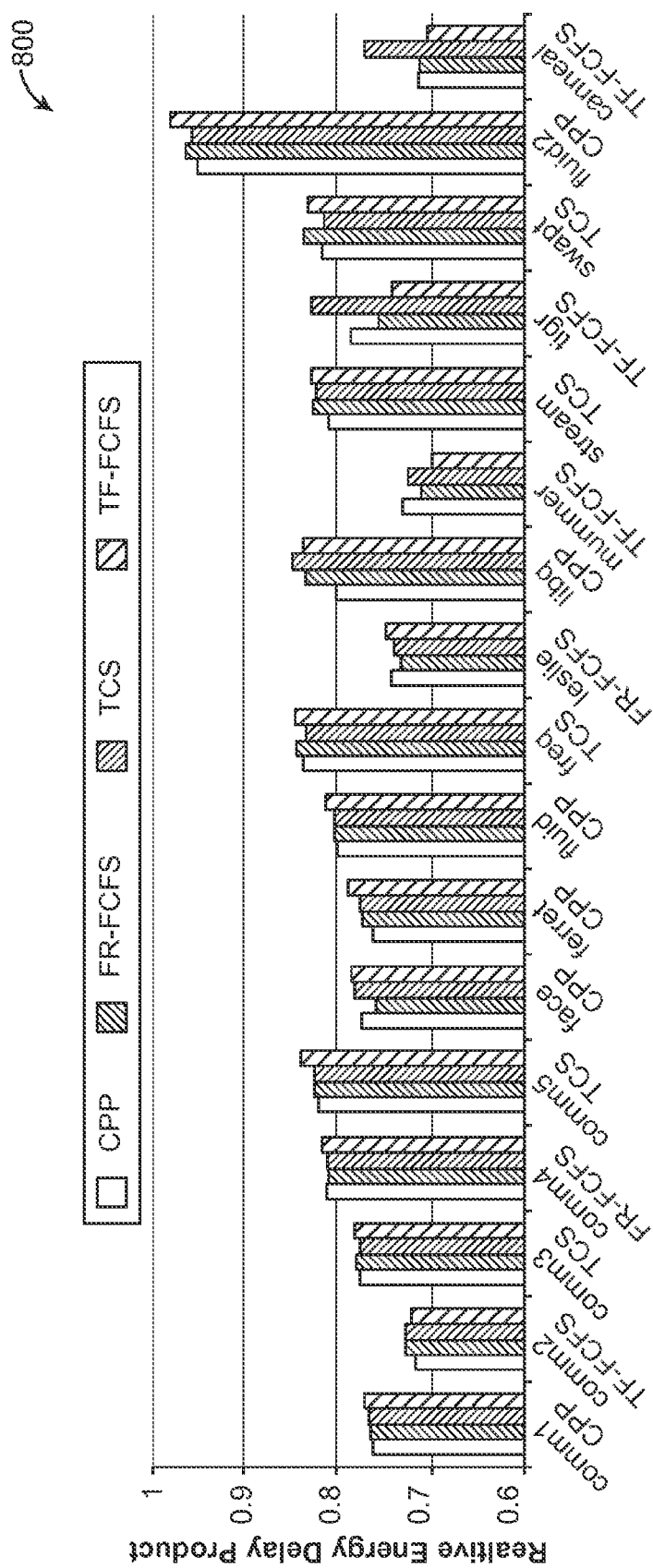
FIG. 8 shows a graph of relative energy delay product of different scheduling processes, according to an embodiment.

FIG. 8 shows a graph 800 of relative energy delay product of different scheduling processes, according to an embodiment. In one example embodiment, energy delay product indicates the similar trend as with performance but with 21.6% improvement on average, as shown in graph 800.

In one or more example embodiments, it is demonstrated that different address mapping schemes significantly affect system performance and energy-efficiency of memory systems. Different applications have their respective favorite address mapping configurations. In one example embodiment, the ADM brokering model 501 brokers with the system and selects the best address mapping scheme. In this example embodiment, the scheduler is fixed for the applications, and all possible address mapping schemes are exhaustively tried (i.e., a sweep of the absolute position of the global bank ID from left to right on address bits). Execution time and energy-delay product of all the applications are collected.

Figure 9:
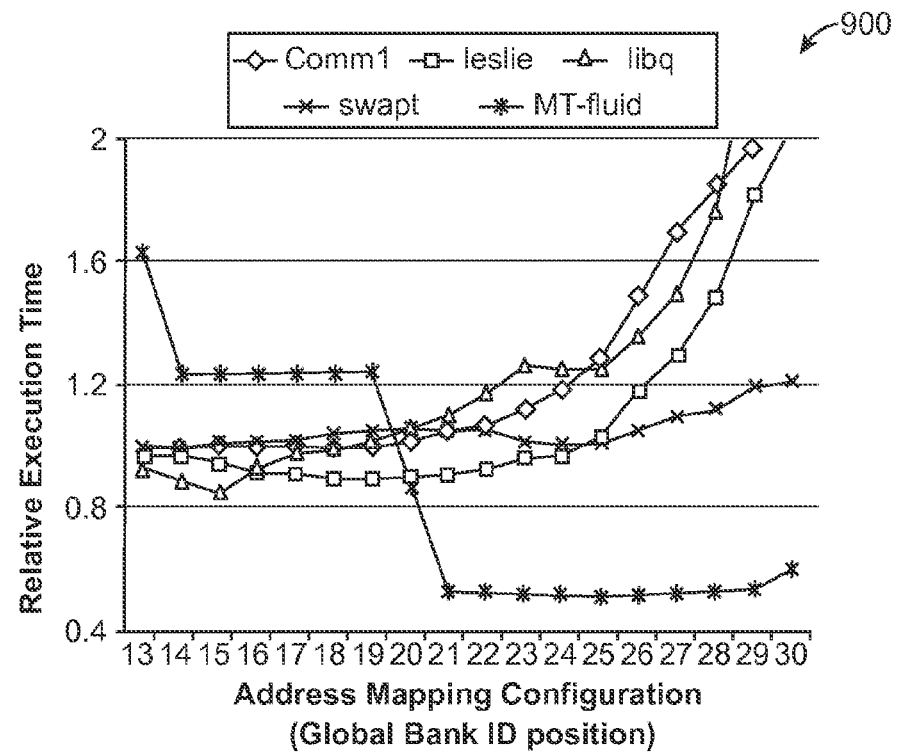
FIG. 9 shows a graph of address mapping impacts on different applications, according to an embodiment.

FIG. 9 shows a graph 900 of address mapping impacts on different applications, according to an embodiment. In one example embodiment, graph 900 shows a representative set of applications for execution time. In one or more example embodiments, EDP measures show a similar trend as previously indicated. As seen in graph 900, the applications behave differently with respect to the address mapping schemes. There is no single configuration that satisfies address mapping requirements of all the applications. The best address mapping scheme for each application is shown in Table II. In one or more embodiments, the simulation using the ADM brokering model 501 results show 15.8% and 29.3% average reduction, respectively for execution time and energy-delay product.

Figure 10:
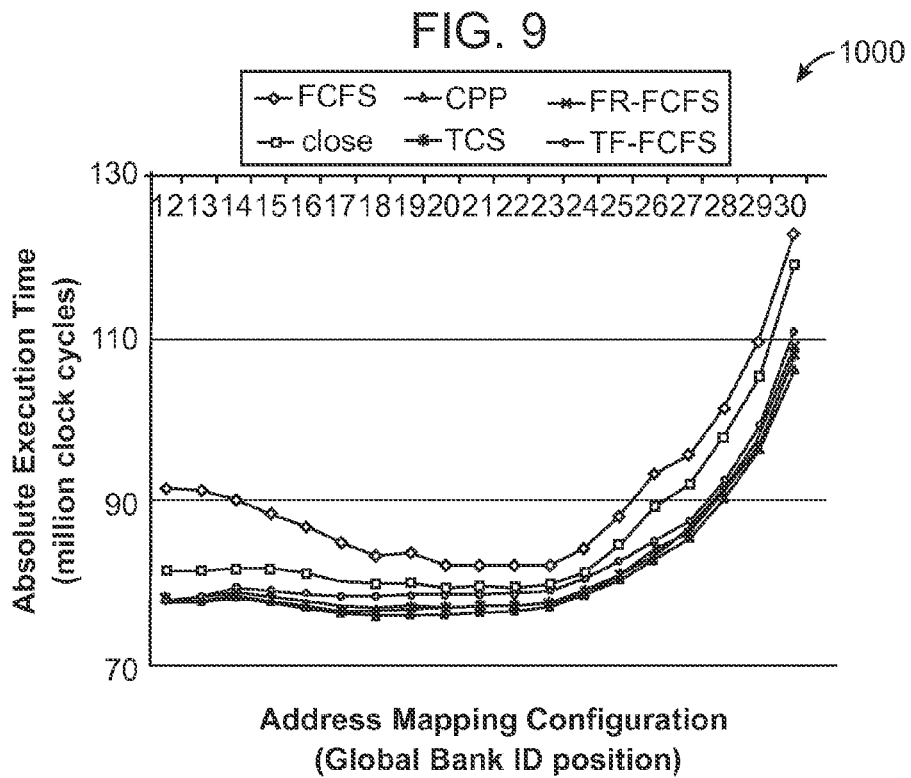
FIG. 10 shows a graph of combination effects of address mapping and scheduling impacts on a selected application, according to an embodiment.

FIG. 10 shows a graph 1000 of combination effects of address mapping and scheduling impacts on a selected application, according to an embodiment. In one embodiment, the scheduler and address mapping schemes are combined. Graph 1000 shows one representative application as an example. As can be seen, in one example embodiment address mapping and scheduling are two orthogonal methods of improving memory transfer frequency. In one or more embodiments, the ADM brokering module 501 is able to combine the two efforts and locate the best combination for higher performance and better energy efficiency. In one example embodiment, based on sampling of six applications, the execution time is reduced by 35.8% on average, while EDP is reduced by 39.4% on average, compared to the average point in the respective design space of each application.

Figure 11:
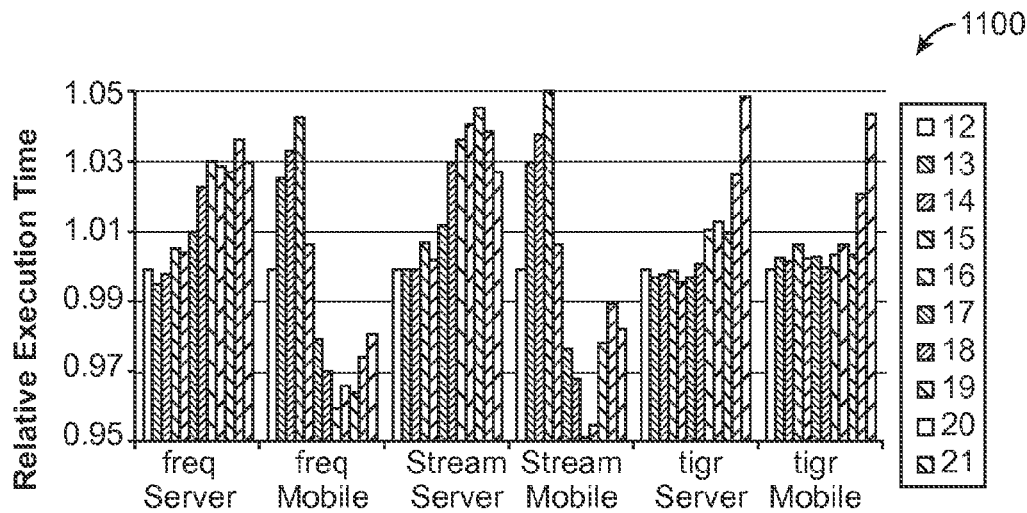
FIG. 11 shows a graph of address mapping changes with system configurations, according to an embodiment.

FIG. 11 shows a graph 1100 of address mapping changes with system configurations, according to an embodiment. The best memory address mapping and scheduling not only depends on applications, but also on system configurations. In one or more embodiments, for the server and mobile systems used as examples, the memory systems have vastly distinct organizations, speed, etc. Thus, the parallelism and locality of DRAM that an application could leverage might be different as well.

Figure 12:
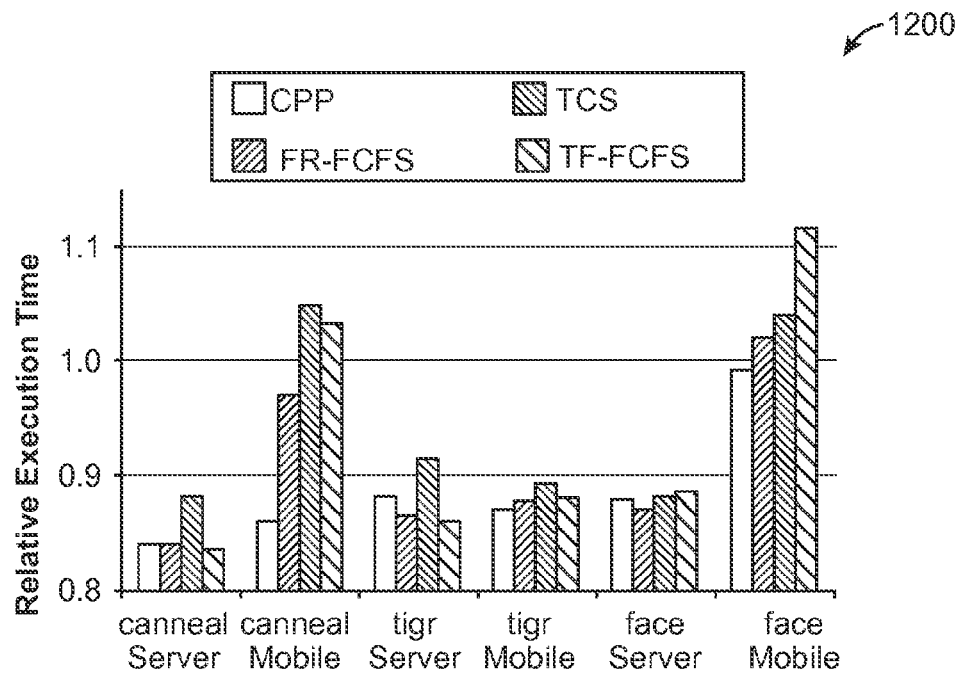
FIG. 12 shows a graph of performance of schedulers on different system setups, according to an embodiment.

FIG. 12 shows a graph 1200 of performance of schedulers on different system setups, according to an embodiment. For the same application running on different systems, different scheduling algorithms might behave differently. In one example embodiment, graph 1200 shows such effect. For instance, for application tigr, which shows high MAPI, low locality, and low bank level parallel on a server platform, TF-FCFS performs relatively well compared to other schedulers on the same platform. However, when running on a mobile platform, the number of parallel banks reduces, and the effective locality and bank-level parallelism increase. As a result, CPP outperforms TF-FCFS, and becomes the relatively best scheduler according to one example embodiment. Therefore, in one embodiment, the ADM brokering model 501 takes account into system configuration when selecting a scheduling algorithm to achieve better performance.

In one or more embodiments, it is noted that the best address mapping also changes with different systems. When a system configuration changes, the number of global bank ID bits, the number of row and column bits varies. Even with the same application, the original address mapping might not take advantage of bank level parallelism and spatial locality, as shown in graph 1100 (FIG. 11). For instance, in application stream, the best address mapping position is 13 in the server setup, and changes to 19 in the mobile setup.

In one or more example embodiments, because the ADM brokering model 501 employed in a system may take advantage of system configuration information in SLR 212, the memory system performance and EDP may also be optimized in the mobile setup. In one embodiment, by combining the effect of scheduling algorithm and address mapping, the execution time is reduced 33.1% on average, while the EDP is reduced 53.6% on average, compared to the average point in the respective design space of each application.

In one or more example embodiments, the ADM brokering model 501 may optimize performance and energy delay product simultaneously for various applications on both server and mobile setups. In one embodiment, ADM brokering model 501 may adapt to optimization goals as well.

Figure 13:
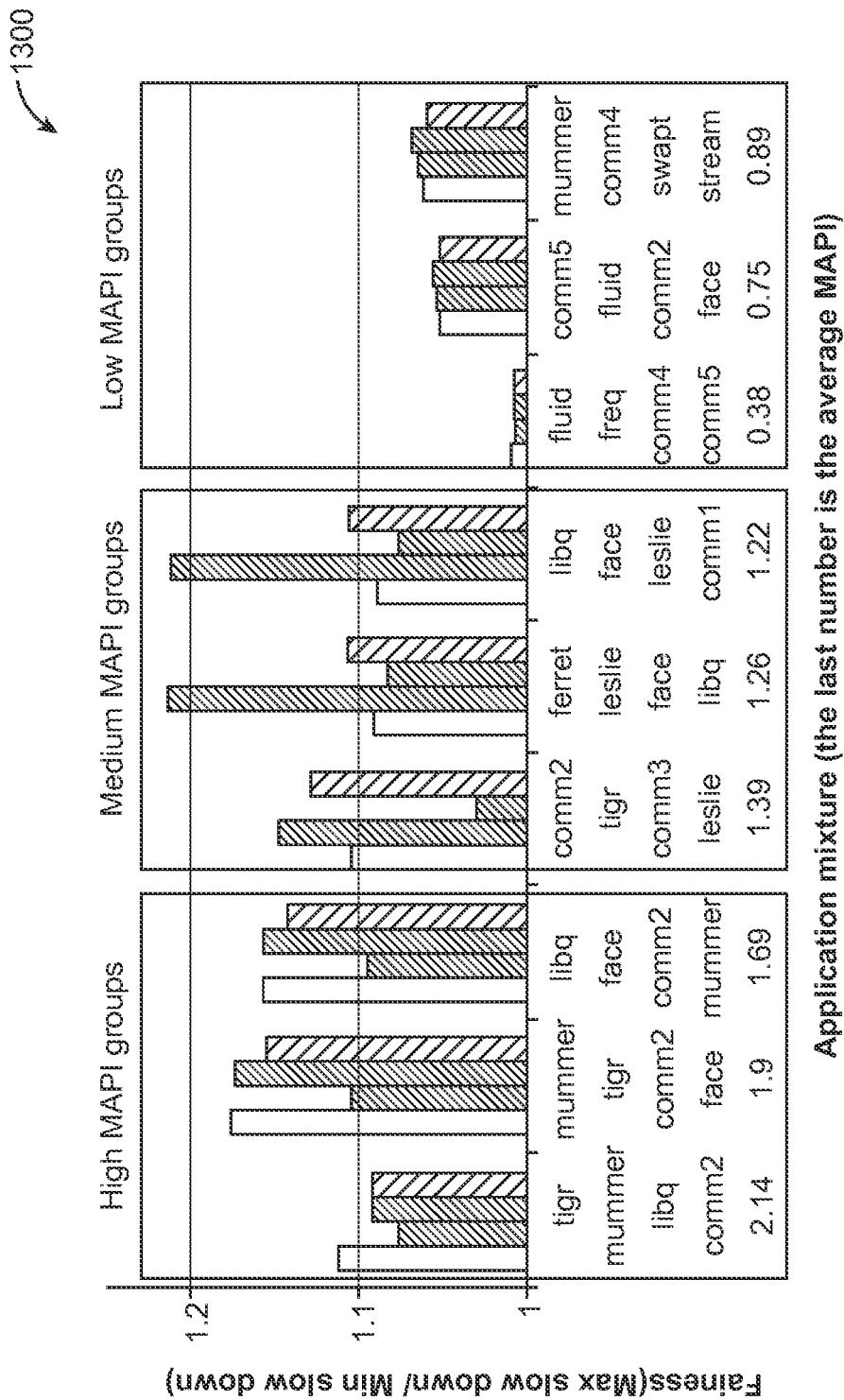
FIG. 13 shows a graph of fairness of nine different application mixes, according to an embodiment.

FIG. 13 shows a graph 1300 of fairness of nine different application mixes, according to an embodiment. In one embodiment, fairness is an additional optimization goal for consideration by the ADM brokering model 501. In one embodiment, fairness requires that when multiple applications are running together in the same system, the memory system (e.g., memory module 138) should serve them equally. The best scheduling algorithm for optimizing performance and EDP might not necessarily optimize for fairness of the system. In one example embodiment, the fairness is measured on a server platform by mixing four applications together, and running them simultaneously. In one example embodiment, the applications are also run individually with the same scheduling algorithm for the same length of trace, and thus it is possible to measure the slowdown as the ratio of execution time between individual run and co-run. In one embodiment, the fairness of the scheduler for this workload combination is defined as the ratio between maximum and minimal slowdown.

In one example embodiment, the broker module 135 selects the best scheduling algorithm for fairness based on the average MAPI. In one embodiment, the simulation results are shown in graph 1300 with MAPI labeled on the bottom of the graph. As can be seen from graph 1300, for application mixes with large MAPI (more than 1.5 in this case), scheduler FR-FCFS performs best for fairness, though CPP works best for performance and EDP. In one example embodiment, for application mixes with small MAPI (less than 1 in this case), there are plenty of memory resources, which means the scheduler choice does not affect the fairness result. In one example embodiment, for the mixes with medium MAPI, TCS is the fairest scheduler. In one or more embodiments, the ADM brokering model 501 improves the fairness by 25.4% on average of sixteen application mixes that were created.

In one or more embodiments, based on the application characteristics, the implementation of the ADM brokering model 501 with electronic devices 120 significantly improves the system performance, energy-efficiency, and fairness by selecting the most suitable scheduling policy and address mapping configuration. In one or more embodiments, ADC implemented in the electronic device 120 configures generic hardware sub-components based on application specific quality. The devices and components used in consumer electronics will continue to be made in large quantity as generic components, making one or more embodiments implementing ADC and ADM for future platforms, mobile and wearable systems affordable. Using the one or more embodiments, however, instead of investing on more powerful components that have more energy budget, manufacturers may use the one or more embodiments to make these generic components smarter and more responsive to application requirements.

In one or more embodiments, ADC may make software interaction with hardware drive the next evolution commodity devices that may become smarter and add value to the products and applications that use them. One or more embodiments using ADM show significant improvements in application runtime and DRAM energy consumption. One or more embodiments using the PMC 610 may be used in SoC. In one or more embodiments, apart from mobile and device solutions, ADC implementations may significantly impact enterprise solutions or future businesses. Some examples are areas that may use power-saving enterprise server modules and memory-based storage architectures.

Figure 14:
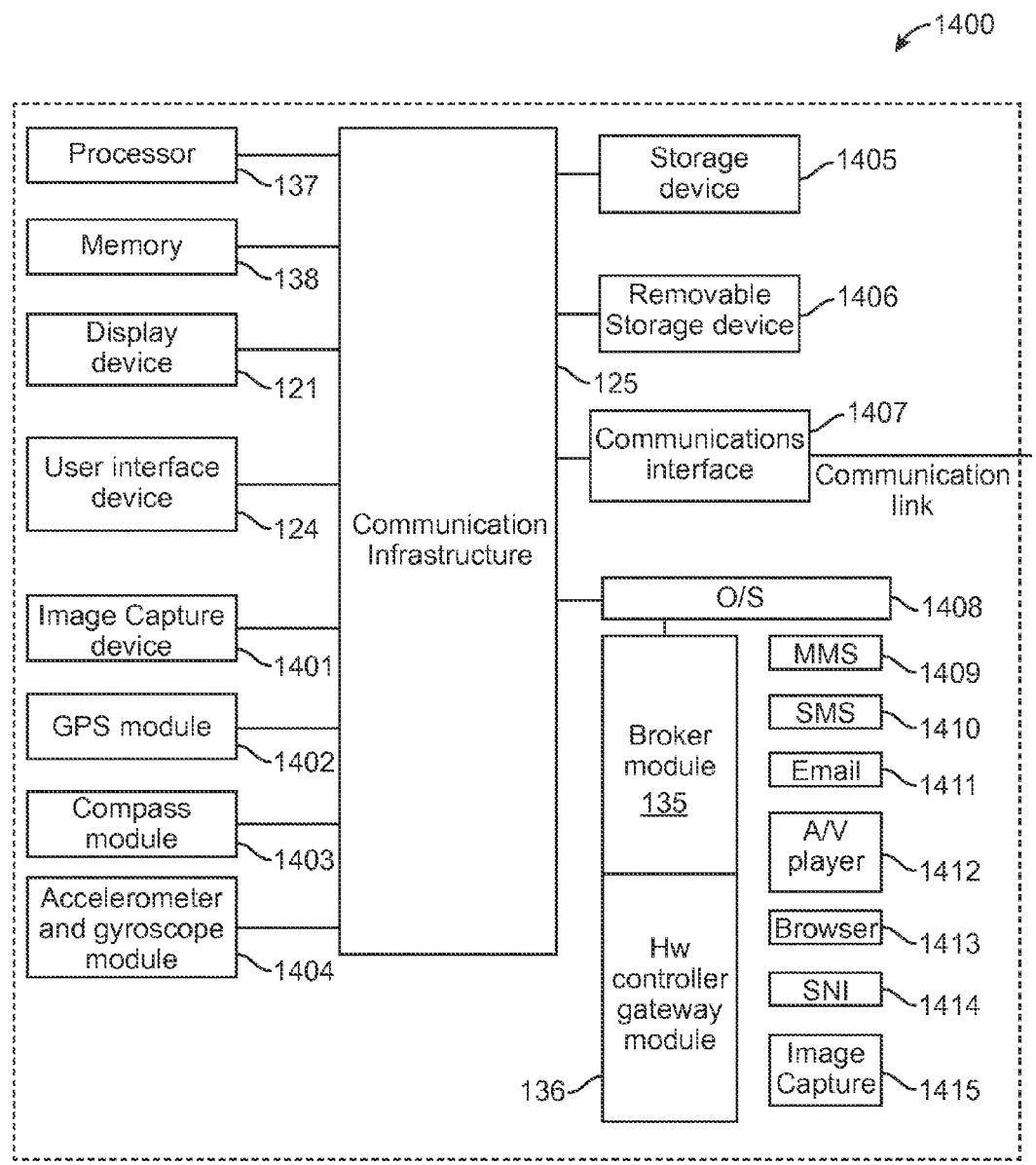
FIG. 14 shows an example architecture, according to an embodiment.

FIG. 14 is a high-level block diagram showing an information processing system comprising a computing system 1400 implementing an embodiment. The system 1400 includes one or more processors in processor module 137 (e.g., ASIC, CPU, etc.), and may further include an electronic display device 121 (for displaying graphics, text, and other data), a main memory in memory module 138 (e.g., DRAM), storage device 1405 (e.g., hard disk drive), removable storage device 1406 (e.g., removable storage drive, removable memory module, a magnetic tape drive, optical disk drive, computer-readable medium having stored therein computer software and/or data), user interface device 124 (e.g., keyboard, touch screen, keypad, pointing device), and a communication interface 1407 (e.g., modem, wireless transceiver (such as WiFi, Cellular), a network interface (such as an Ethernet card), a communications port, or a PCMCIA slot and card). The communication interface 1407 allows software and data to be transferred between the computer system and external devices. The system 1400 further includes a communications infrastructure 125 (e.g., a communications bus, cross-over bar, or network) to which the aforementioned devices/modules shown in system 1400 are connected.

The information transferred via communications interface 1407 may be in the form of signals such as electronic, electromagnetic, optical, or other signals capable of being received by communications interface 1407, via a communication link that carries signals and may be implemented using wire or cable, fiber optics, a phone line, a cellular phone link, an radio frequency (RF) link, and/or other communication channels.

In one implementation of an embodiment in a mobile wireless device such as a mobile phone, the system 1400 further includes an image capture device 1401 such as one or more cameras, a GPS module 1402, a compass module 1403 and an acceleration and gyroscope module 1404. The system 1400 may further include application modules as MMS module 1409, SMS module 1410, email module 1411, social network interface (SNI) module 1414, audio/video (AV) player 1412, web browser 1413, image capture module 1415, etc.

The system 1400 further includes a broker module 135 and hardware controller gateway module 136 as described herein, according to an embodiment. In one implementation of said image processing modules 135 and 136 along an operating system 1408 may be implemented as executable code residing in a memory of the system 1400. In another embodiment, such modules are in firmware, etc.

Figure 15:
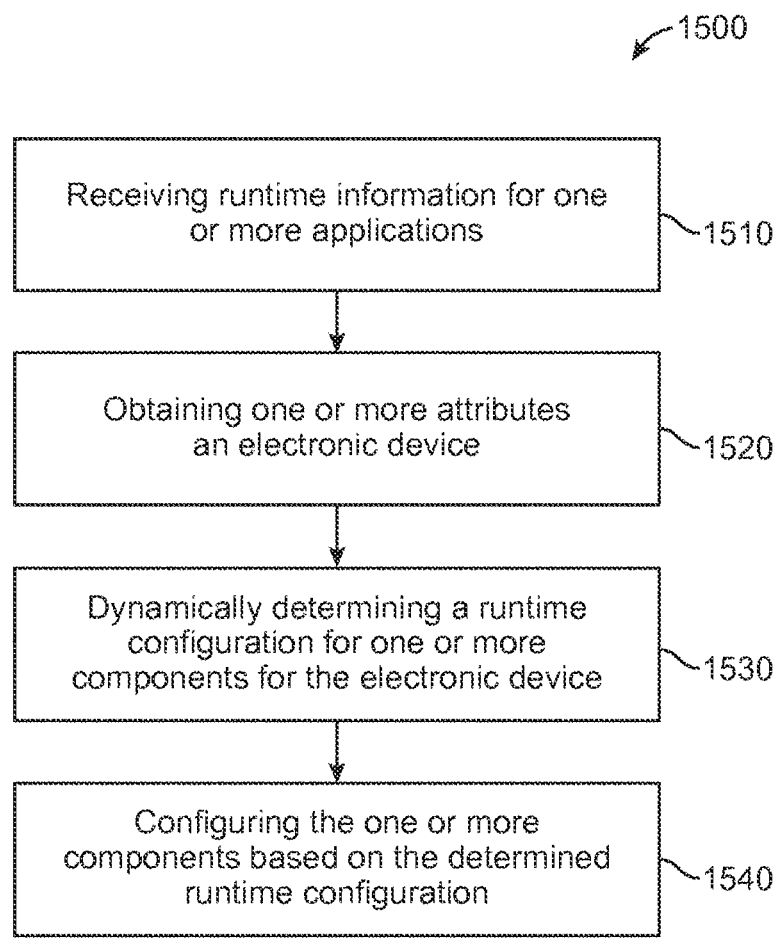
FIG. 15 shows a flow process for application defined computing, according to an embodiment.

FIG. 15 shows a flow process 1500 for application defined computing, according to an embodiment. In block 1510 runtime information (e.g., SLH 211) for one or more applications is received (e.g., by the broker module 135). In one embodiment, in block 1520 one or more attributes (e.g., SLR 212) for an electronic device (e.g., electronic device 120) are obtained (e.g., by the broker module 135). In one embodiment, in block 1530 a runtime configuration is determined (e.g., dynamically, statically, etc.) for one or more components for the electronic device (e.g., by the broker module 135 implementing the ADM brokering module 501). In one embodiment, in block 1540 the one or more components are configured (e.g., by the hardware controller gateway module 136 implementing the PMC 610) based on the determined runtime configuration.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A configurable computing system comprising:
a processor configured to receive information for at least one application, to obtain at least one attribute for an electronic device, to determine configurations for at least one component for the electronic device, and to execute a process using an application defined memory (ADM) brokering model configured to manage at least one memory bandwidth aspect; and
a controller configured to communicate with applications to configure the at least one component based on the configurations.

2. The system of claim 1, wherein the information comprises at least one of application characteristics, user priorities and hardware specifications.

3. The system of claim 2, wherein the at least one component comprises at least one of computing devices, a processor, and a memory comprising at least one memory storage device.

4. The system of claim 3, wherein the memory is configurable based on changing application specific attributes, hardware configurations, or user priorities using address mapping and command scheduling.

5. The system of claim 3, wherein the memory is configured using a programmable memory controller for programming using at least one instruction set.

6. The system of claim 5, wherein the programmable memory controller comprises:
a request processor that comprises a first domain-specific instruction set architecture (ISA) configured to accelerate command requests;
a transaction processor that comprises a second domain-specific ISA configured to accelerate transaction processing tasks; and
a dedicated command logic configured to inspect each memory command to memory storage devices and to stall particular commands to meet timing constraints to control the memory storage devices.

7. The system of claim 6, wherein the electronic device comprises a mobile electronic device, a server device or a computer device.

8. The system of claim 1, wherein the at least one attribute for the electronic devices comprises energy, performance, endurance, capacity or fault-tolerance.

9. The system of claim 1, wherein the ADM brokering model is configured to manage the at least one memory bandwidth aspect using application specific bandwidth utilization and bandwidth allocation.

10. The system of claim 9, wherein the ADM process is used for user-defined quality of service and configured to run applications in two categories comprising single-application priority (SAP) and multiple-application priority (MAP).

11. The system of claim 10, wherein bandwidth utilization is based on memory demand intensity (MDI) and data transfer frequency (DTF).

12. The system of claim 11, wherein MDI comprises characteristic of an application that is measured based on memory accesses per unit time generated by the application when running, and DTF comprises a metric based on dynamic random access memory (DRAM) spatial locality and bank-level parallelism.

13. The system of claim 12, wherein DTF depends on application behavior and hardware specific characteristics, and the ADM process is configured to determine thresholds for MDI and DTF to classify different applications.

14. The system of claim 13, wherein the ADM process is configured to determine whether user priority is MAP or SAP, and to determine the configurations based on MDI and DTF.

15. A non-transitory processor-readable medium that includes a program that when executed by a processor performs a method comprising:
   receiving information for at least one application;
   obtaining at least one attribute for an electronic device;
   determining configurations for at least one component for the electronic device;
   managing at least one memory bandwidth aspect using an application defined memory (ADM) brokering model; and
   configuring the at least one component based on the determined configurations.

16. The non-transitory processor-readable medium of claim 15, wherein the information comprises at least one of application characteristics, user priorities and hardware specifications.

17. The non-transitory processor-readable medium of claim 16, wherein the at least one component comprises at least one of computing devices, a processor, and a memory comprising at least one memory storage device.

18. The non-transitory processor-readable medium of claim 17, wherein the memory is configurable based on changing application specific attributes, hardware configurations, or user priorities using address mapping and command scheduling.

19. The non-transitory processor-readable medium of claim 15, the method further comprising:
   configuring memory using a programmable memory controller for programming using at least one instruction set, wherein said configuring the memory comprises:
      accelerating common requests by a request processor that comprises a first domain-specific instruction set architecture (ISA);
      accelerating transaction processing tasks by a transaction processor that comprises a second domain-specific ISA; and
      inspecting each memory command to a memory device and stalling particular commands for meeting timing constraints for application specific control of the memory device by dedicated command logic.

20. The non-transitory processor-readable medium of claim 16, wherein the at least one attribute for the electronic device comprises energy, performance, endurance, capacity and fault-tolerance, and the user priorities are based on the at least one attributes.

21. The non-transitory processor-readable medium of claim 15, wherein managing at least one memory bandwidth aspect comprises the ADM brokering model using application specific bandwidth utilization and bandwidth allocation, and the ADM brokering model is used for user-defined quality of service for running applications in two categories comprising single-application priority (SAP) and multiple-application priority (MAP).

22. The non-transitory processor-readable medium of claim 21, wherein bandwidth utilization is based on memory demand intensity (MDI) and data transfer frequency (DTF), MDI comprises characteristic of an application that is measured based on memory accesses per unit time generated by the application when running, and DTF comprises a metric based on dynamic random access memory (DRAM) spatial locality and bank-level parallelism.

23. The non-transitory processor-readable medium of claim 22, wherein DTF depends on application behavior and hardware specific characteristics, and the ADM brokering model determines thresholds for MDI and DTF for classifying different applications.

24. The non-transitory processor-readable medium of claim 23, wherein the ADM brokering model determines whether user priority is MAP or SAP, and determines the configurations based on MDI and DTF.

25. An electronic device comprising:
   a memory device;
   a processor configured to receive information for at least one application, to obtain at least one desired attribute for the electronic device, to determine at least one runtime configuration for a set of computing components for the electronic device, and to execute a process using an application defined memory (ADM) brokering model configured to manage at least one memory bandwidth aspect of the memory device; and
   a controller configured to communicate with applications to configure a set of computing components based on the at least one determined runtime configuration.

26. The electronic device of claim 25, wherein the information comprises at least one of application characteristics, user priorities and hardware specifications, and the set of computing components comprises at least one of: configurable processors, configurable memory devices, and a configurable display.

27. The electronic device of claim 25, wherein the at least one attribute for the electronic device comprises energy, performance, endurance, capacity and fault-tolerance, and the user priorities are based on the at least one attributes.

28. The electronic device of claim 25, wherein the process is configured to manage the at least one memory aspect with the ADM brokering model configured to manage the memory device using application specific bandwidth utilization and bandwidth allocation, and the ADM brokering model is used for user-defined quality of service to run applications in two categories comprising single-application priority (SAP) and multiple-application priority (MAP).

29. The electronic device of claim 28, wherein bandwidth utilization is based on memory demand intensity (MDI) and data transfer frequency (DTF), MDI comprises characteristic of an application that is measured based on memory accesses per unit time generated by the application when running, and DTF comprises a metric based on dynamic random access memory (DRAM) spatial locality and bank-level parallelism.

30. The electronic device of claim 29, wherein DTF depends on application behavior and hardware specific characteristics, the ADM brokering model is configured to determine thresholds for MDI and DTF to classify different applications, and the ADM brokering model is configured to determine whether user priority is MAP or SAP, and to determine the configurations based on MDI and DTF.

* * * * *